US006735337B2

(12) United States Patent
Lee et al.

(10) Patent No.: US 6,735,337 B2
(45) Date of Patent: May 11, 2004

(54) ROBUST METHOD FOR AUTOMATIC READING OF SKEWED, ROTATED OR PARTIALLY OBSCURED CHARACTERS

(76) Inventors: Shih-Jong J. Lee, 15418 SE. 53rd Pl., Bellevue, WA (US) 98006; Louis Piloco, 23219 112th Pl. SE., Kent, WA (US) 98031

(*) Notice: Subject to any disclaimer, the term of this patent is extended or adjusted under 35 U.S.C. 154(b) by 617 days.

(21) Appl. No.: 09/775,954

(22) Filed: Feb. 2, 2001

(65) Prior Publication Data

US 2002/0131642 A1 Sep. 19, 2002

(51) Int. Cl.[7] ........................... G06K 9/34; G06K 9/36; G06K 9/68

(52) U.S. Cl. ........................ 382/220; 382/177; 382/284

(58) Field of Search ................................ 382/168, 172, 382/173, 176, 177, 180, 190, 219, 220, 224, 225, 229, 254, 284, 290, 291, 292, 294, 310

(56) References Cited

U.S. PATENT DOCUMENTS

| | | | | | |
|---|---|---|---|---|---|
| 4,850,025 | A | * | 7/1989 | Abe | 382/220 |
| 5,687,253 | A | * | 11/1997 | Huttenlocher et al. | 382/177 |
| 5,729,635 | A | * | 3/1998 | Fast et al. | 382/254 |
| 5,778,103 | A | * | 7/1998 | Allan et al. | 382/254 |
| 5,805,747 | A | * | 9/1998 | Bradford | 382/310 |
| 5,850,480 | A | * | 12/1998 | Scanlon | 382/229 |
| 5,943,443 | A | * | 8/1999 | Itonori et al. | 382/225 |
| 6,154,579 | A | * | 11/2000 | Goldberg | 382/310 |
| 6,256,410 | B1 | * | 7/2001 | Nathan et al. | 382/187 |
| 6,389,163 | B1 | * | 5/2002 | Jodoin et al. | 382/173 |
| 6,400,849 | B1 | * | 6/2002 | Lee et al. | 382/260 |
| 6,404,934 | B1 | * | 6/2002 | Lee et al. | 382/260 |
| 6,456,741 | B1 | * | 9/2002 | Lee et al. | 382/190 |
| 6,463,175 | B1 | * | 10/2002 | Lee | 382/190 |
| 6,504,959 | B1 | * | 1/2003 | Lee | 382/260 |
| 6,614,930 | B1 | * | 9/2003 | Agnihotri et al. | 382/176 |

* cited by examiner

*Primary Examiner*—Andrew W. Johns
*Assistant Examiner*—Amir Alavi

(57) ABSTRACT

A character reading technique recognizes character strings in grayscale images where characters within such strings have poor contrast, are variable in position or rotation with respect to other characters in the string, or where portions of characters in the string are partially obscured. The method improves classification accuracy by improving the robustness of the underlying correlation operation. Characters are divided into regions before performing correlations. Based upon the relative individual region results, region results are combined into a whole character result. Using the characters that are read, a running checksum is computed and, based upon the checksum result, characters are replaced to produce a valid result.

24 Claims, 18 Drawing Sheets

ROBUST METHOD FOR AUTOMATIC READING OF SKEWED, ROTATED OR PARTIALLY OBSCURED CHARACTERS

U.S. PATENT REFERENCES:

1. U.s. Patent 5,850,480 entitled, " OCR error correction methods and apparatus utilizing contextual comparison", by Scanlon et. al. Dec. 15, 1998.
2. U.S. Patent 5,805,747 entitled, " Apparatus and method for OCR character and confidence determination using multiple OCR device", by Bradford et. al., Sep. 8, 1998
3. U.S. Patent 6,154,579 entitled, " Confusion matrix based method and system for correcting mis-recognized words appearing in documents generated by an optical character recognition technique" by Goldberg et. al., Nov. 28, 2000

Co-Pending U.S Patent Applications

1. U.S. Patent Application Ser. No. 09/693,723, " Image Processing System with Enhanced Processing and Memory Management", by Shih-Jong J. Lee et. al, filed Oct.20, 2000
2. U.S. Patent Application Ser. No. 09/693,378, " Image Processing Apparatus Using a Cascade of Poly-Point Operations", by Shih-Jong J. Lee, filed Oct. 20, 2000
3. U.S. Patent Application Ser. No. 09/692,948, " High Speed Image Processing Apparatus Using a Cascade of Elongated Filters Programmed in a Computer", by Shih-iong J. Lee et. al., filed Oct. 20, 2000
4. U.S. Patent Application Ser. No. 09/7030 18, " Automatic Referencing for Computer Vision Applications", by Shih-Jong J. Lee et. al, filed Oct. 31, 2000
5. U.S. Patent Application Ser. No. 09/702,629, " Run-Length Based Image Processing Programmed in a Computer", by Shih-Jong J. Lee, filed Oct. 31, 2000
6. U.S. Patent Application 09/738,846 entitled, " Structure-guided Image Processing and Image Feature Enhancement" by Shih-Jong J. Lee, filed Dec. 15, 2000.
7. U.S. Patent Application 09/739,084 entitled, " Structure-guided Image Measurement Method", by Shih-Jong J. Lee et. at. filed Dec. 15, 2000.

REFERENCES

1. Duda, RO and Hart PE, " Pattern Classification and Scene Analysis," John Wiley and Sons, New York, 1973, PP.332–335.
2. Haralick RM and Shapiro, LG, " Survey Image Segmentation Techniques," Comput. Vision, Graphics Image Processing, vol. 29: 100-132, 1985.
3. Otsu N, " A Threshold Selection Method for Gray-level Histograms," IEEE Trans. System Man and Cybernetics, vol. SMC-9, No. 1, Jan. 1979, pp 62–66
4. Ballard and Brown, " Computer Vision", ISBN 0-13-1653164, Prentice Hall 1982, Chapter 3, pp 67–69
5. Semiconductor Equipment and Material International, SEMI specification M13-0998, " Specification For Alphanumeric Marking Of Silicon Wafers", 3081 Zanker Road, San Jose, Calif. 95134

TECHNICAL FIELD

The present method relates generally to character reading and more specifically to a robust technique for recognizing character strings in grayscale images where such strings may be of poor contrast or where some characters in the text string or the entire text string may be distorted or partially obscured.

BACKGROUND OF THE INVENTION

Various approaches have been applied to improve the classification accuracy for optical character recognition (OCR) methods. The present method relates generally to optical character recognition and more specifically to a technique for recognizing character strings in grayscale images where such strings may be of poor contrast, variable in position or rotation with respect to other characters in the string or where characters in the string may be partially obscured.

Different challenges are posed in many industrial machine vision character reading applications, such as semiconductor wafer serial number identification, semiconductor chip package print character verification, vehicle tire identification, license plate reading, etc. In these applications, the font, size, and character set are well defined yet the images may be low contrast, individual or groups of characters imprinted in the application may be skewed in rotation or misaligned in position or both, characters may be partially obscured, and the image may be acquired from objects under varying lighting conditions, image system distortions, etc. The challenge in these cases is to achieve highly accurate, repeatable, and robust character reading results.

Character recognition in digital computer images is an important machine vision application. Prior art optical character recognition methods work well (i.e. achieve high classification accuracy) when image contrast is sufficient to separate, or segment, the text from the background. In applications such as document scanning, the illumination and optical systems are designed to maximize signal contrast so that foreground (text) and background separation is easy. Furthermore, conventional approaches require that the characters be presented in their entirety and not be obscured or corrupted to any significant degree. While this is possible with binary images acquired from a scanner or grayscale images acquired from a well controlled low noise image capture environment, it is not possible in a number of machine vision applications such as parts inspection, semiconductor processing, or circuit board inspection. These industrial applications are particularly difficult to deal with because of poor contrast or character obscuration. Applications such as these suffer from a significant degradation in classification accuracy because of the poor characteristics of the input image. The method described herein utilizes two approaches to improve classification accuracy: (1) using region-based hit or miss character correlation and (2) field context information.

In the preferred embodiment, the invention described herein is particularly well suited for optical character recognition on text strings with poor contrast and partial character obscuration as is typically the case in the manufacture of silicon wafers. Many semiconductor manufacturers now include a vendor code on each wafer for identification purposes and to monitor each wafer as it moves from process to process. The processing of silicon wafers involves many steps such as photolithographic exposure etching, baking, and various chemical and physical processes. Each of these processes has the potential for corrupting the vendor code. Usually the corruption results in poor contrast between the characters or the background for some portion of the vendor code. In more severe cases, some of the characters may be photo-lithographically overwritten (exposed) with the pattern of an electronic circuit. This type of obscuration is difficult if not impossible to accommodate with prior art methods. Another possibility is that the vendor code will be written a character at a time (or in character groups) as processes accumulate. This can result in characters within the text string that are skewed or rotated with respect to the alignment of the overall text string.

PRIOR ART

Computerized document processing includes scanning of the document and the conversion of the actual image of a document into an electronic image of the document. The scanning process generates an electronic pixel representation of the image with a density of several hundred pixels per inch. Each pixel is at least represented by a unit of information indicating whether the particular pixel is associated with a 'white' or a 'black' area in the document. Pixel information may include colors other than 'black' and 'white', and it may include gray scale information. The pixel image of a document may be stored and processed directly or it may be converted into a compressed image that requires less space for storing the image on a storage medium such as a storage disk in a computer. Images of documents are often processed through OCR (Optical Character Recognition) so that the contents can be converted back to ASCII (American Standard Code for Information Interchange) coded text.

In image processing and character recognition, proper orientation of the image on the document to be processed is advantageous. One of the parameters to which image processing operations are sensitive is the skew of the image in the image field. The present invention provides for preprocessing of individual characters to eliminate skew and rotation characteristics detrimental to many image processing operations either for speed or accuracy. The present invention also accommodates characters that may be partially corrupted or obscured.

Prior art attempts to improve character classification accuracy by performing a contextual comparison between the raw OCR string output from the recognition engine and a lexicon of permissible words or character strings containing at least a portion of the characters contained in the unknown input string (U.S. Pat. No. 5,850,480 by Scanlon et. al. entitled "OCR error correction methods and apparatus utilizing contextual comparison" Second Preferred Method Embodiment paragraphs 2–4). Typically, replacement words or character strings are assigned confidence values indicating the likelihood that the string represents the intended sequence of characters. Because Scanlon's method requires a large lexicon of acceptable string sequences, it is computationally expensive to implement since comparisons must be made between the unknown sequence and all of the string sequences in the lexicon. Scanlon's method is limited to applications where context information is readily available. Typical examples of this type of application include processing forms that have data fields with finite contents such as in computerized forms where city or state fields have been provided.

Other prior art approaches (U.S. Pat. No. 6,154,579 by Goldberg et. al. entitled "Confusion Matrix Based Method and System for Correcting Misrecognized Words Appearing in Documents Generated by an Optical Character Recognition Technique", Nov. 28, 2000, Detailed Description of the Invention, paragraphs 4–7 inclusive) improve overall classification accuracy by employing a confusion matrix based on sentence structure, grammatical rules or spell checking algorithms subsequent to the primary OCR recognition phase. Each reference word is assigned a replacement word probability. This method, although effective for language based OCR, does not apply to strings that have no grammatical or structural context such as part numbers, random string sequences, encoded phrases or passwords, etc. In addition, Goldbergs approach does not reprocess the image to provide new input to the OCR algorithm.

Other prior art methods improve classification performance by utilizing a plurality of OCR sensing devices as input (U.S. Pat. No. 5,807,747 by Bradford et. al. entitled "Apparatus and method for OCR character and confidence determination using multiple OCR devices", Sep. 8, 1998, Detailed Description of the Preferred Embodiments, paragraphs 4–7 inclusive). With this approach a bitmapped representation of the text from each device is presented to the OCR software for independent evaluation. The OCR software produces a character and an associated confidence level for each input device and the results of each are presented to a voting unit that tabulates the overall results. This technique requires additional costly hardware and highly redundant processing of the input string, yet it does not resolve misalignment or rotation or obscuration input degradations, and it is not useful for improving impairment caused by character motion or applications where character images are received sequentially in time from a single source and does not use learning of correlation weights to minimize source image noise.

OBJECTS AND ADVANTAGES

It is an object of this invention to use region-based normalized cross-correlation to increase character classification accuracy by reducing the contribution to the overall score on portions of a character that may be obscured.

It is an object of this invention to use morphological processing to determine the polarity of the text relative to the background.

It is an object of this invention to use structure guided morphological processing and grayscale dispersion to identify the location of a text string in a grayscale image.

It is an object of this invention to adjust the skew prior to correlation with the feature template to minimize the number of correlation operations required for each character.

It is an object of this invention to adjust the individual character rotation prior to correlation with the feature template to minimize the number of correlation operations required for each character and to enhance accuracy.

It is an object of this invention to treat the character input region of interest (ROI) as a mixture of two separate populations (background, foreground) of grayscale values and to adaptively determine the optimal threshold value required to separate these populations.

It is an object of this invention to improve character classification accuracy by applying field context rules that govern the types of alphanumeric characters that are permissible in the field being processed and hence the specific correlations that will be performed.

It is an object of this invention to decrease the weight on portions of the character that exhibit high variation and ultimately contribute to a less reliable classification such that they contribute less to the overall hit correlation score $H_n(P)$. Portions of the character that exhibit less variation during the learning process are consequently weighted higher making their contribution to the hit (or miss) correlation score more significant.

SUMMARY OF THE INVENTION

The method described herein improves classification accuracy by improving the effectiveness or robustness of the underlying normalized correlation operation. In one embodiment this is achieved by partitioning each unknown input character into several pre-defined overlapping regions. Each region is evaluated independently against a library of template regions. A normalized correlation operation is then performed between the unknown input character region and each of the character template regions defined in the character library. Doing so provides two substantial benefits over prior art methods. First, portions of the character that may be obscured or noisy in a systematic way are removed from the correlation operation thus minimizing their detrimental impact on the overall classification of the character. Second, the remaining portions of the character, those without obscuration, are weighted more heavily than they otherwise would be, thus improving the degree of correlation with the actual character and increasing the margin between the actual character and the next most likely character. In the simplest implementation, the portion of the character that yields the lowest correlation score can be defined as the most likely portion of the character containing an obscuration or imaging degradation and its effects minimized by the approach described.

In image processing and character recognition, proper orientation of the image on the document to be processed is advantageous. One of the parameters to which template based image processing operations are sensitive is the skew of the image in the image field. The present invention provides for pre-processing of images to eliminate skew and rotation. The processes of the present invention provides for consistent character registration and converts inverse type to normal type to simplify processing.

DETAILED DESCRIPTION OF THE INVENTION

I. Overall Algorithm Description

Figure 1:
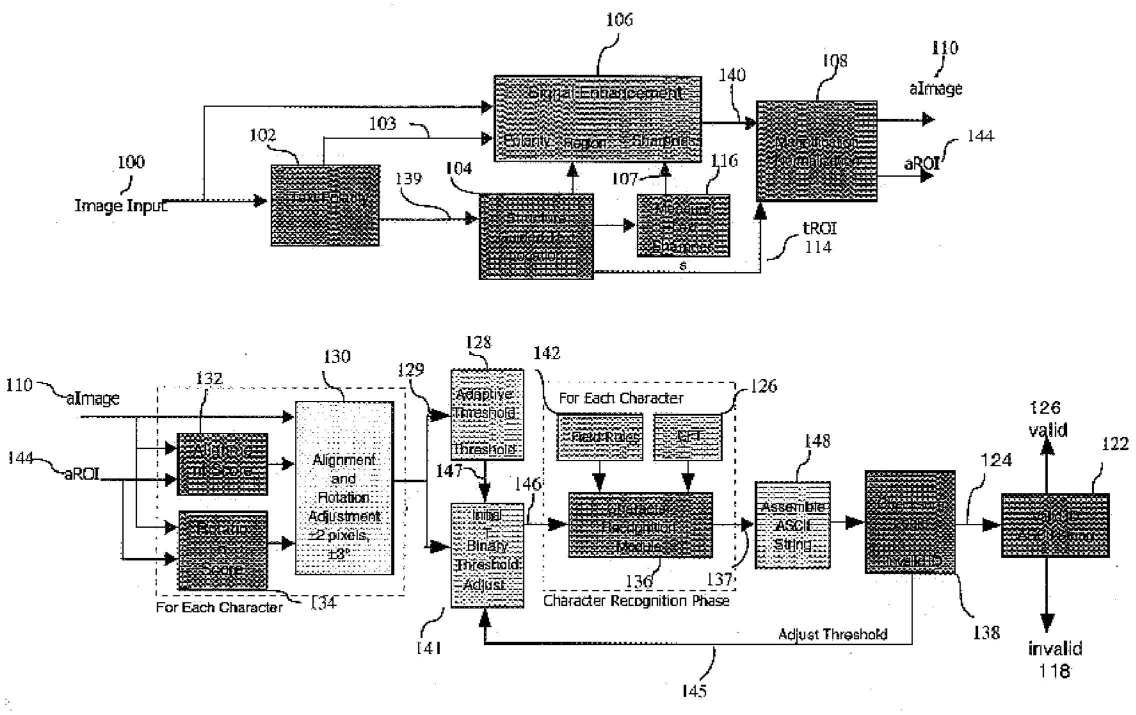
FIG. 1 block diagram for a robust OCR algorithm

FIG. 1 outlines the processing flow for a preferred embodiment of this invention. Grayscale images of silicon wafers containing a laser etched Manufacturer ID are presented as input 100 to the algorithm. In the preferred embodiment the character font, size and approximate orientation are known a-priori, however, the location of the text string in the image is unknown. The semiconductor industry has adopted OCR-A as the standard font and the embodiment described herein has been tuned to this particular font. It is important to note, however, that font specific information is contained in the Character Feature Template (CFT) 126 and the feature template can be easily adjusted to accommodate any particular font. In this embodiment, the expected character size is 18×20 pixels. The average intensity value of the character string is unknown and may be brighter or darker than the background. The apparatus shown diagrammatically in FIG. 1 can accommodate various types of character distortion as allowed within SEMI specification M13-0998 Specification For Alphanumeric Marking Of Silicon Wafers. Specifically the algorithm is designed to handle character skew of up to ±2 pixels and character rotation within the range ±3°. The algorithm can also accommodate partial character obscuration of up to ⅓ of the characters overall height.

Figure 12:
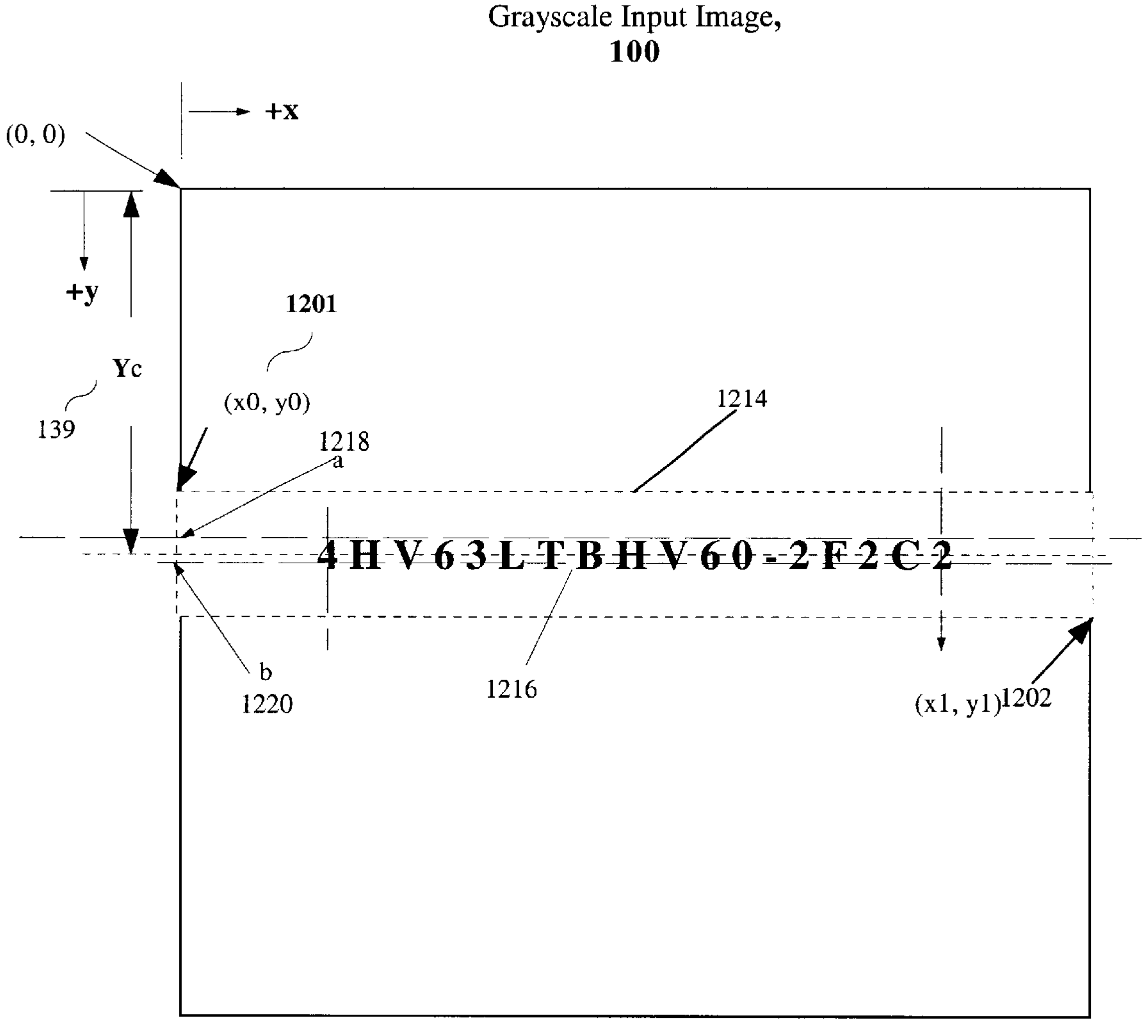
FIG. 12 is a diagram of the region defined by tROI

Images presented to the character recognition apparatus contain manufacturer identification numbers 1509 (see FIG. 15) that can be brighter or darker than the background pattern. The first stage of the processing, Text Polarity 102, determines the brightness of the text relative to the background. This information is provided to both the Signal Enhancement 106 and Text Location 104 modules so that the morphological operations in these blocks can be tailored for the specific text polarity. Text Polarity 102 also provides information regarding the location of the text in the vertical y-dimension. This information is stored in the parameter, Yc 139 and used by Text Location 104, to localize the image processing to the regions containing text (see also FIG. 12). Yc is the y coordinate of peak dispersion 139 used as an estimate of text string location in y. In one embodiment of the invention, the initial text region of interest (tROI) configuration is:

$$x0=0$$

$$y0=Yc-Th$$

$$x1=\text{Image Width}$$

$$y1=Yc+Th$$

$$Th=3*\text{Expected Text Height}$$

Alignment of the individual characters with their templates reduces the amount of processing and improves the overall execution speed.

The Signal Enhancement module 106 operates on image 100 and is responsible for improving the contrast between the foreground text and the background. The module uses morphological operations to enhance text edges in the region specified by the region of interest tROI 114 obtained from Text Location 104. These morphological operations (opening, closing residue) do not introduce any position phase shift in the text so the location of the string defined by tROI 114 is unaffected. If the input image 100 contains highly focused text, then Text Sharpness 116, filters the enhanced image with a 3×3 Gaussian filter to reduce aliasing effect during the character recognition process 136.

The Measure Text Sharpness module 116 determines the edge sharpness of the input text by measuring the rate of change of pixel intensities near text edges. If the text is determined to be sharp then the flag TextSharpness 107 is set to true. If the contrary is determined then the flag is set to false. This information is used by Signal Enhancement Module 106 to low pass filter the text if it is too sharp.

The Magnification Normalization Module 108 adjusts the size of the incoming enhanced image 140 and tROI 114 so that, during the character recognition phase 136, the characters have the same physical dimensions as the features in the Correlation Feature Template 126. Module 108 applies an Affine Transformation to scale the entire image 140. The scaling operation is required so that the correlation operation performed during the character recognition phase 136 makes the correct association between features in the Character Feature Template 126 and input pixels in the unknown character. The resulting adjusted image aImage 110 is stored for use by modules 132 through 137. The region of interest tROI, is also scaled accordingly so that the region contains the entire text string. The adjusted region aROI 144 is used by modules 130, 132 134 to locate the exact position of the adjusted text image.

The Alignment Score module 132 computes an alignment score for each of the characters in the input string contained in the region specified by aROI 144. The alignment score represents the y-offset that yields the best individual vertical dispersion for each of the characters. The score is determined by deriving the $2^{nd}$ order moment for the character's horizontal dispersion. The y-offset that yields the highest score is designated as the optimal position. This alignment score is used immediately prior to correlation to adjust the position of the character so that optimal alignment is achieved prior to correlation. In this embodiment, the x-axis positional accuracy of the Text Location module 104 is sufficiently accurate that adjustments in the x axis are not required prior to correlation.

The Rotation Score module 134 computes a rotation score that represents the characters rotation with respect to the vertical axis. This module produces a value between +3 and −3 degrees for character axis rotation.

The Alignment Rotation Adjustment Module 130 applies the y-offset determined in 132 to the appropriate character region of interest (ROI), cROI 1216 in the aROI string and adjusts the rotation of the characters to an expected position. The resulting characters are then available for processing. Adjustments are made on a per character basis. cROI is the character region in the input image before alignment and rotation are performed.

The Adaptive Threshold Module 128, processes the grayscale text image 129 defined by aROI 144. This module performs a histogram operation over the entire region 144 of image 110 encompassing all characters in the ID. The resulting histogram 1000 is treated as a bimodal distribution of both foreground (text) and background pixels. The histogram (see FIG. 10) analysis yields an intensity threshold value 1002 that separates these two populations of pixels. This intensity value is used as an initial threshold value for the Binary Threshold module 141.

Figure 16:
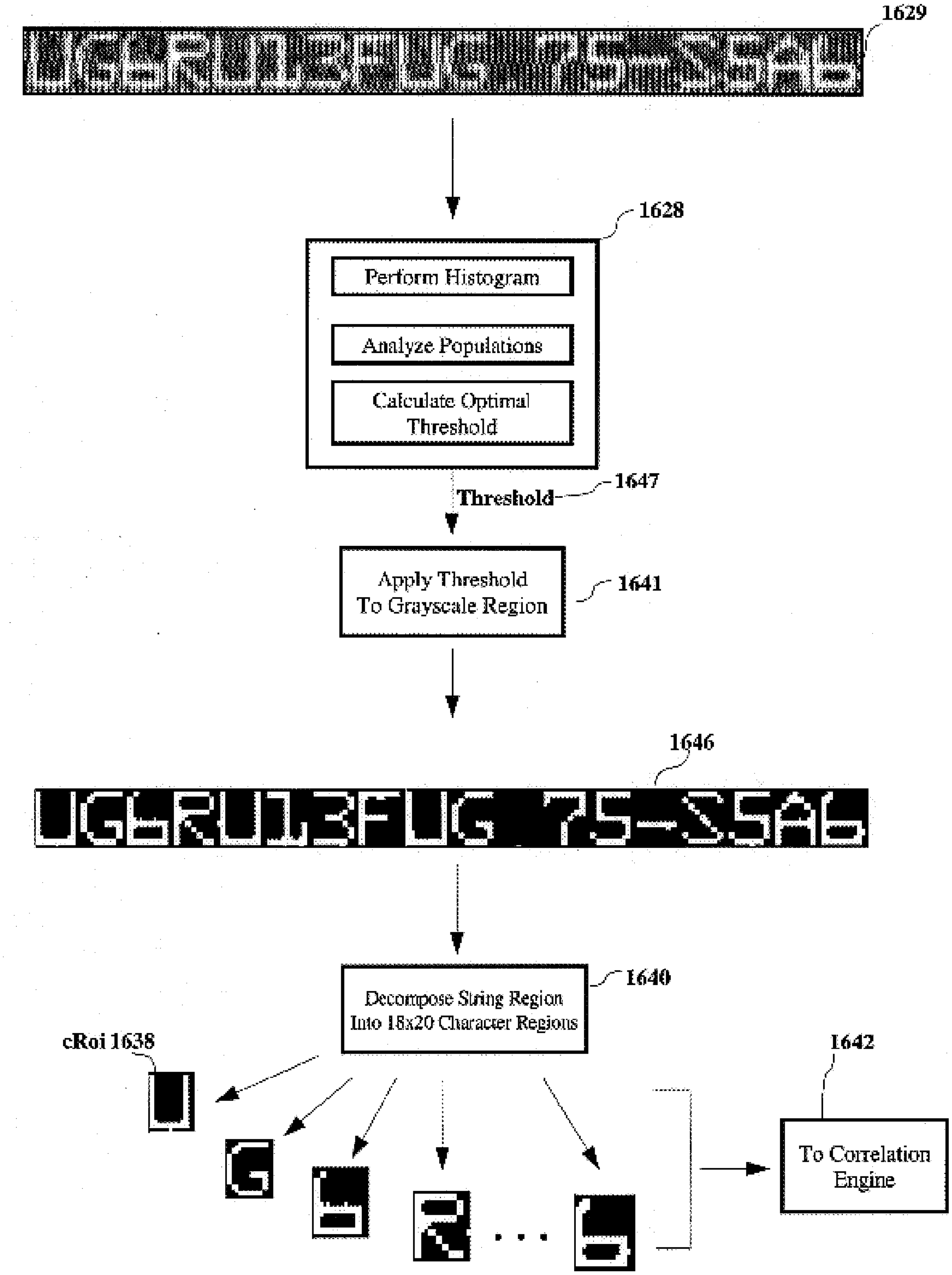
FIG. 16 shows an example for the adaptive threshold process

The Binary Threshold module 141 performs a binary threshold operation on the grayscale region of aImage 129 containing the sequence of unknown text characters resulting in a binary version of the image 146. This initial threshold value is obtained from the Adaptive Threshold module 128 and is used as the initial threshold value for the character recognition module 136. Module 136 performs the normalized regional correlation operation on each character within 129 determining the most likely ASCII value for each. Module 148 assembles each character into an ASCII string terminated by a NULL character. This string is then passed to the checksum to determine if the decoded characters comply with the checksum logic. If the checksum logic determines that the WaferID is invalid and cannot be made valid by reconsideration of certain characters, then the threshold is decremented and control flow returns to module 141 where the grayscale input, aImage 129, is thresholded with the modified threshold value. The resulting binary image 146 is then processed once again by module 136. The format of 146 is a binary array of pixels representing the input characters. An example of this output is shown in FIG. 16 (1646). In one embodiment of the invention, the ID includes 18 characters and the array of pixels is 20 pixels high by 324 pixels wide (18 pixels per character×18 characters=324).

The Character Recognition Module 136 parses the image 129 into 18 character regions 18 pixels wide by 20 pixels height. Each of the 18 characters is processed independently to determine the correlation, or the degree of similarity, between the input character and a known character contained in the Character Feature Template (CFT) 126. Unlike traditional correlation approaches that compute a single score for the entire character, this embodiment computes a correlation score for three specific and potentially overlapping regions of the character. These regional correlation scores are combined in such a way that sections of the character that may be partially obscured are de-rated in the whole character correlation result. As a result, the contribution from the other two regions becomes more significant in the overall correlation score.

Figure 13:
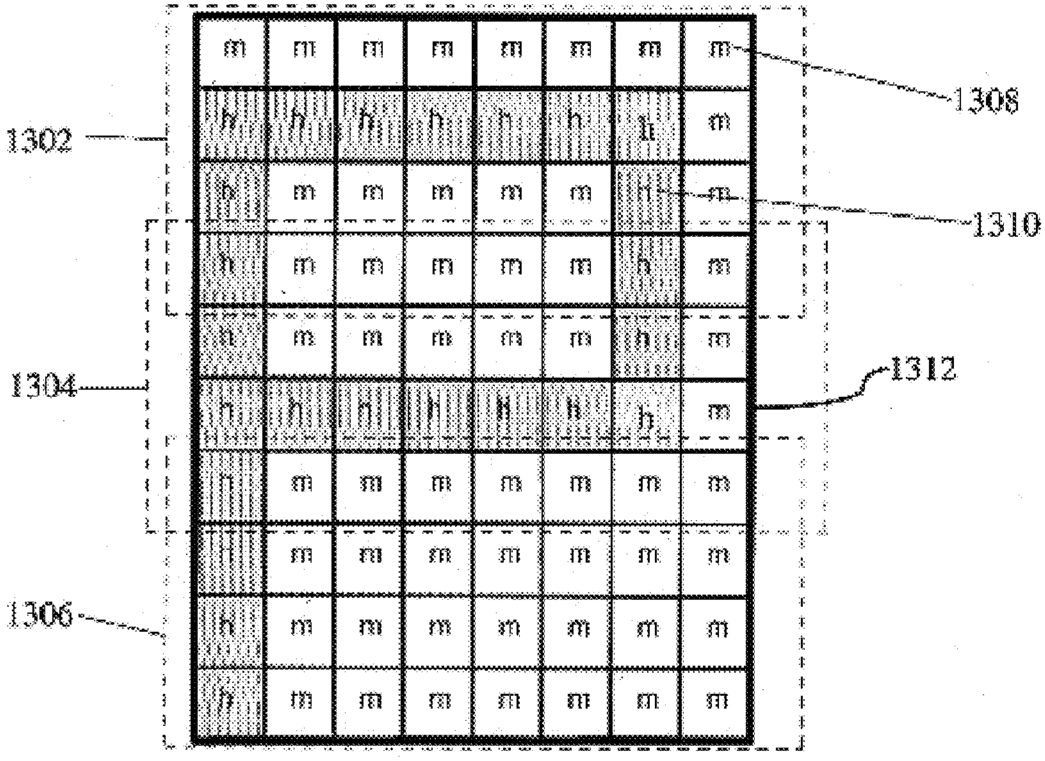
FIG. 13 shows a Character Feature Template (CFT) for character "P" with hit and miss designations

The Character Feature Template 126 is an array of data structures that contains pixel information regarding each possible character in the character set. In the present embodiment there are 26 upper case alpha characters, 10 numeric characters and 2 special case characters (the period "." and hyphen "-") for a total of 38 possible characters. Each CFT 126 defines the state of a pixel in an ideal binary version of the input character. FIG. 13 shows an example of the CFT 126 for the character P. If a pixel in the template is active, or on, for the current character, then the cell location is designated "h" for hit. If a pixel in the template is inactive, or off, for the character in question then the feature is designated "m" for miss. In the present embodiment the CFT 126 is comprised of three overlapping regions and the correlation operation is performed independently on these three regions. In addition, separate hit and miss correlation scores are generated according to the equations outlined in section XII Hit or Miss Correlation Algorithm.

II. Text Polarity Determination

Figure 2:
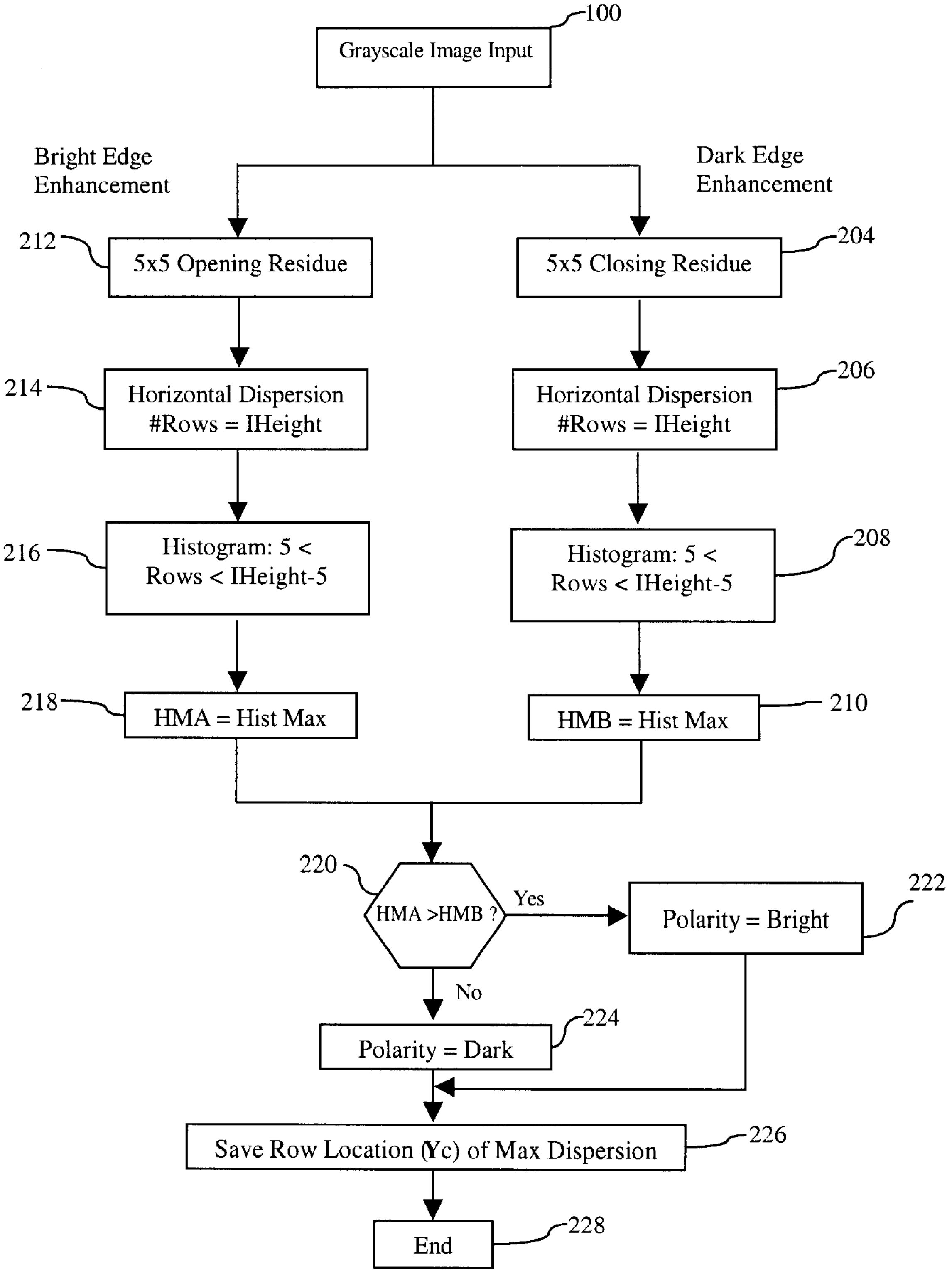
FIG. 2 shows the flow diagram for text polarity detection

FIG. 2 outlines the operations used to determine the polarity of the text in the input image. The text polarity is defined as the intensity of the text relative to the background. This information is required by the processing performed in subsequent stages of the apparatus. If the intensity of the text is greater than the average value of the background, then global flag Polarity is set to Bright 222. If the intensity of the text is less then the average value of the background then the Polarity variable is set to Dark 224. The first set of operations on the left side of the diagram 212, 214, 216, 218 enhances the edges of bright objects on a dark background by performing an opening residue operation 212 on the grey scale input image 100. A grayscale opening residue operation is known to those skilled in the art, as a means for enhancing bright edges against a dark background. The mathematical equation for a gray scale opening residue is $$I - I \circ A$$

where:

I is the original grayscale input image $\circ$ is the symbol for grayscale opening operation A is the structuring element The grayscale opening operation ($I \circ A$) is defined as:

$$(I \ominus A) \oplus A$$

where:

$\oplus$ represents the grayscale dilation operation (Sternberg, 1986).

$\Theta$ represents the grayscale erosion operation

A represents the structuring element

The size of structuring element A is chosen based on the expected height of the text string, which for this embodiment is 18 pixels. Both dimensions of the two-dimensional structuring element A are chosen to be approximately ⅓ of the anticipated text height. The structuring element A is chosen to be flat in its height and rectangular in its shape for computational efficiency reasons. Other structuring elements with circular shape or unequal height such as parallelogram could be used to reduce a particular noise effect.

The result of the opening residue operation is presented to a module that performs a horizontal dispersion operation. A horizontal dispersion operation produces a 1-dimensional grayscale summation of all the pixels contained on each row of the image. This technique is convenient to quickly locate the position of bright or dark areas of the image along the direction perpendicular to the axis of dispersion that are of particular interest to the application.

The result of the 1 dimensional dispersion operation is passed to a function 216 that determines the maximum value of the horizontal dispersion data. The first and last 5 values of the dispersion array are ignored so that boundary effects resulting from the morphological operations can be ignored.

For dark edge enhancement, the same sequence of operations is performed on the original input image 100 with the exception that the opening residue is replaced with a closing residue 204. This determines the strength of the text for images containing dark text on a bright background.

Once the dispersion information has been performed on the output of both branches of the module 102, the output amplitudes are compared 210, 218. If the maximum amplitude, HMA 218 of the horizontal dispersion histogram for the opening residue exceeds that of the closing residue, HMB 220, then the text is brighter than the background. If the maximum amplitude of the closing operation HMB, exceeds that of the opening operation, HMA, then the text is darker than the background 224.

In addition to determining the text polarity, the algorithm records the location of the row that contained the maximum dispersion value 226. This information is used by module 104 to focus the image processing in a region centered at the y-coordinate, Yc, where the maximum dispersion, and hence the text, is most likely positioned.

III. Structure Guided Coarse Text Location

Figure 3:
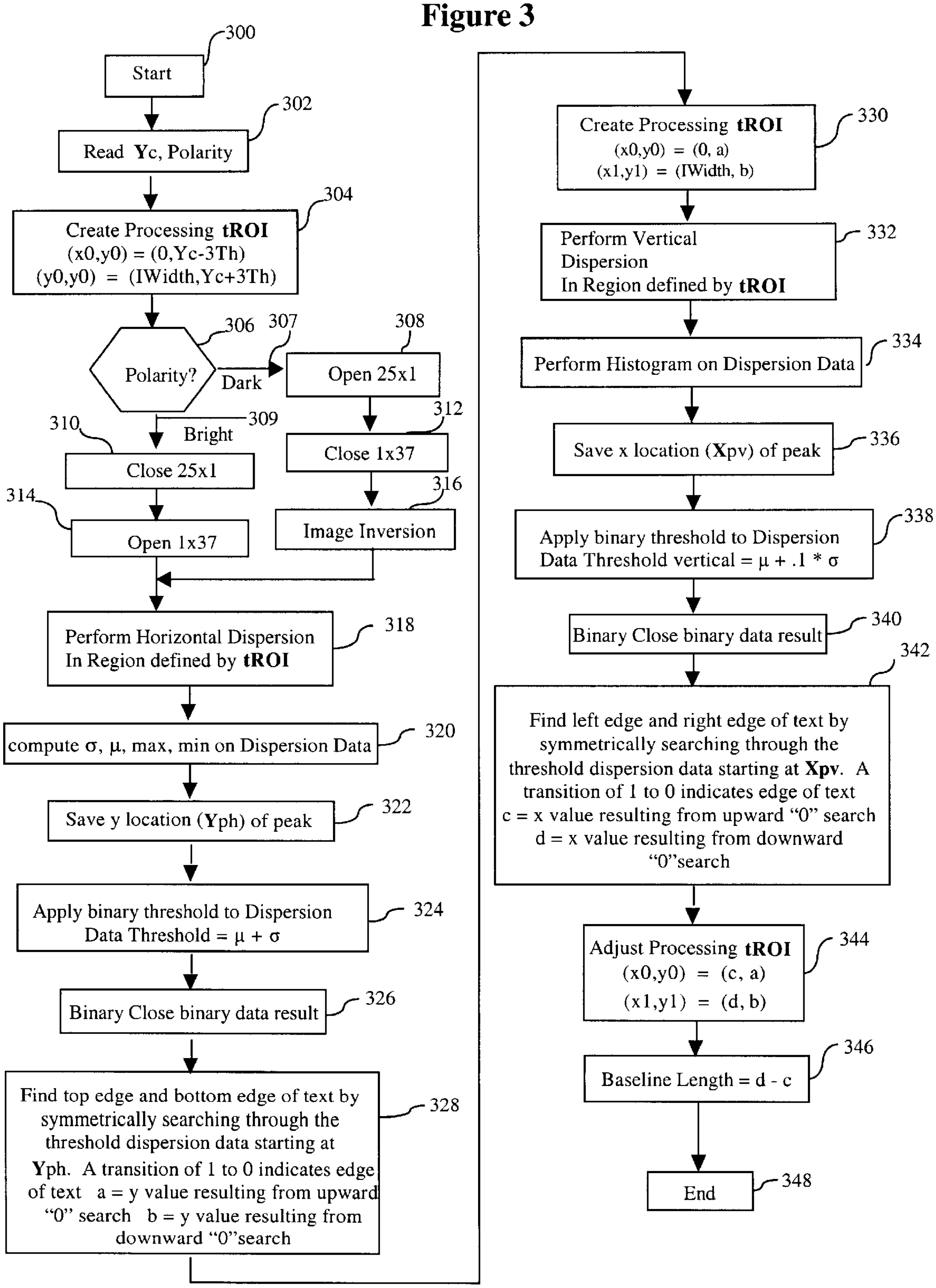
FIG. 3 shows the flow diagram for structure guided text location

FIG. 3 is a flow diagram of the steps involved in determining the location of the text in the input image 104. This algorithm uses text structure information such as string height and string length (in pixels) to extract the location of the text in the image. Structure guiding techniques for identifying objects based on shape is disclosed in U.S. patent application Ser. No. 09/738,846 entitled, "Structure-guided Image Processing and Image Feature Enhancement" by Shih-Jong J. Lee, filed Dec. 15, 2000 which is incorporated in its entirety herein.

The location of the text string, once it is determined, is specified by the data structure tROI 114. This structure contains a set of coordinates that define a bounding region that encapsulates the 18-character text string. The tROI data structure contains two coordinates 1201 that describe the upper left hand corner and the lower right hand corner 1202 of the region tROI. tROI is used by modules 106, 108 and 116 to constrain image processing operations to the region containing the text, thus reducing the number of pixels in the image that must be processed to locate text to within 2 pixels in y and 0 pixels in x. Additional processing shown in FIG. 3 teaches the refinement of tROI to a precise region 1216. Further refinement of the y-location is performed during a latter stage in the processing referred to as Alignment and Rotation correction 130. Determining the text location precisely is important because the number of correlation operations that need to be performed during the character recognition phase is significantly reduced if the location of the text is known precisely and the text is pre-aligned. The rotation correction also depends critically on knowledge of individual character centroid location.

Figure 15:
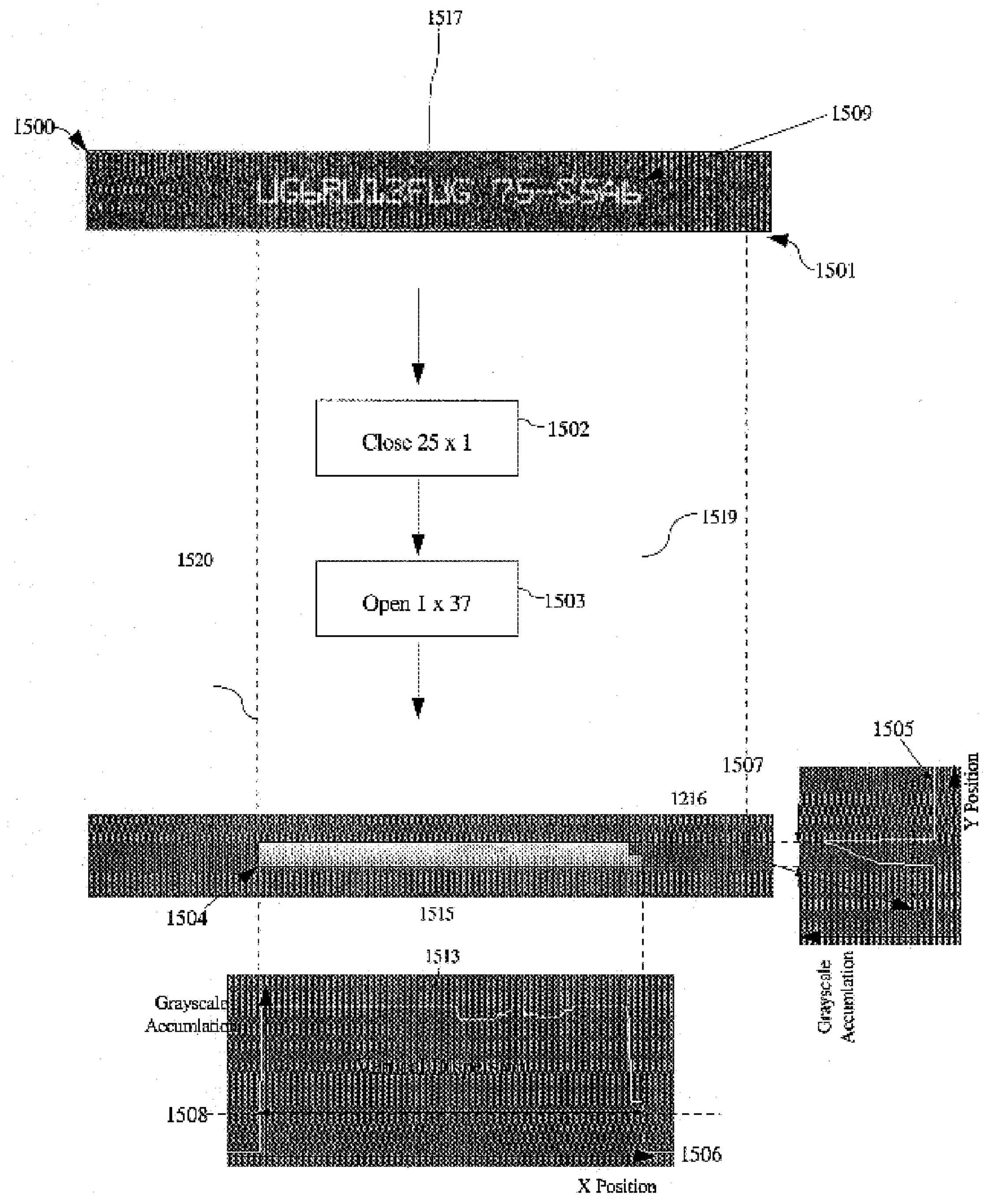
FIG. 15 shows an example of structure guided text location processing

FIG. 15 shows actual image processing results in one embodiment of the invention for both a horizontal and a vertical dispersion operation performed on a portion of an image containing a WaferID 1509 (this example shows bright text on a dark background, Polarity=Bright). Grayscale morphological operations 1502 and 1503, are performed on a region defined by the coordinates $(0, Y_c-3*T_h)$ 1500 and 1501 (ImageWidth, $Y_c+3*T_h$). Both coordinates 1500 and 1501 are determined such that the entire width of the image is processed while only a certain number of rows centered about $Y_c$ 226 (from the Text Polarity) are processed ($Y_c \pm T_h$). The value and the size of the morphological operations 1502 and 1503 are chosen based on the structure (physical dimensions) of the input text. For this example 1509 the polarity of the text is bright relative to the background. This sequence of operations closes all intensity gaps between the individual characters so that there is a more significant difference in grayscale amplitude between the text region and the background region before the dispersion operation is performed. This amplitude differential improves the effectiveness of the dispersion operation by providing additional signal in the text region making it easier to select the threshold required to segregate the foreground and background pixels. Furthermore, this morphological sequence does not introduce a phase or positional shift to pixels comprising the character string, as would be the case if a linear filter were used in place of the morphological operations (reference U.S. patent application Ser. No. 09/739,084 entitled, "Structure Guided Image Measurement Method", by Shih-Jong J. Lee et. al filed Dec. 15, 2000 and incorporated herein in its entirety). Thus, this approach preserves the edge location of the text 1519, 1520 while at the same time improving the effectiveness of the horizontal 1505 and vertical 1513 dispersion operations. 1511 shows the WaferID image after the application of structure guided morphological operations 1502 and 1503. 1505 shows a graphical plot of the horizontal dispersion distribution. The horizontal dispersion operation is used to determine the height and location of the text region 1216 in the y-dimension. 1513 shows a plot of the vertical dispersion operation used to determine the precise location and width 1515 of the text string in the x-axis. The dotted lines in FIG. 15 show the alignment of the rectangular region relative to the original input image. Notice that the processing region tROI shown in 1509 has now been adjusted so that it contains only pixels containing text 1504. The height 1216 is determined by thresholding 1507 the 1-dimensional horizontal dispersion data at a value equal to the sum of the mean $\mu$ and 1 standard deviation $\sigma$ (FIG. 3 324). The resulting binary array of pixels is then subjected to a 1-dimensional morphological closing operation. The result is processed in 328 (FIG. 3) to locate the y-coordinates corresponding to the binary transition at the top and bottom edge of the text. The same sequence of operations is performed by steps 330 through 342 to determine the location of the left and right edge of the text. However, the threshold for the vertical dispersion is set to 0.1 $\sigma$ since the dispersion spreads over the string of characters. The two x and y locations corresponding to the text edges are used to refine the location of tROI in step 344 (see FIG. 12 1218 and 1220).

The first step in the processing to determine the text location involves reading the polarity value 139 generated by the Text Polarity block and the y location of the string. One of the outputs of the Text Polarity stage 102 is an estimate of the y coordinate of the text string Yc 139. This location is used to initialize a processing region, TROI 304, that will be used to refine the location of the string in x and y. This region, tROI is defined as, $$\text{Upper left hand corner of region } (x0, y0)=0, Yc-3*T_h$$

$$\text{Lower right hand corner of region } (x1, y1)=Iwidth, Yc+3*T_h$$

Where:

Iwidth=width of the input image (in pixels)

Th=character height (in pixels)

Once the processing region is defined 304, a series of morphological operations are performed to create a singular representation of characters in a rectangular block. The type of morphological operations depends on the type of input text. If the text polarity 306 is bright 309 (bright text-dark background) then a 25×1 closing 310 is performed followed by a 1×37 opening operation 314. These operations minimize dark background noise and highlight objects that are brighter than the background.

If the polarity of the text is dark 307 (text darker than background) then a 25×1 opening operation 308 is performed followed by a 1×37 closing 312. This sequence minimizes bright background noise and highlights objects that are darker than the background. To ensure that the remainder of the processing in the module is identical for both bright and dark text, the image is inverted 316 so that bright text on a dark background is processed.

In another embodiment it would be a simple matter to replace the dark text processing sequence (operations 308, 312 and 316) with a simple image inversion prior to operation 310.

An inherent and important characteristic of morphological processing used in this embodiment is that enhancing image features through use of nonlinear image processing does not introduce significant phase shift and/or blurry effect (transient aberration). Refer to co-pending U.S. patent application Ser. No. 09/738,846 entitled, "Structure-guided Image Processing and Image Feature Enhancement" by Shih-Jong J. Lee, filed Dec. 15, 2000 the contents of which is incorporated in its entirety herein.

These morphological operations 310, 314, or 308, 312 condition the image for a horizontal dispersion operation 318 to determine the rows within the processing region of interest, tROI, that contain text data. The horizontal dispersion operation sums up the pixel grayscale values for each horizontal row in the region defined by tRoi. This information is then fed to a function 320 that determines the mean, standard deviation, and maximum values for the dispersion values inside the region defined by tROI. The text at this point in the processing is easily distinguishable from the background and can be segmented by applying a simple threshold operation 324 (See also FIG. 15, 1507). One threshold choice for this operation is given by the following equation.

$$\text{Threshold}=\mu+\sigma$$

Where $\mu$ is the mean of pixels in the tROI region $\sigma$ is the standard deviation of pixels in the tROI region In the case where the text is known to be (nearly) horizontally oriented, this sequence of operations yields a very accurate result for y0 and y1—the lines containing text. The reason is a horizontally oriented character string results in a dispersion profile with significantly higher grayscale summation amplitudes in the lines containing text than those lines without text.

To locate the text horizontally, a vertical dispersion operation is performed. The region of the gray scale text image that has been located vertically is stored in memory 330 and a vertical dispersion operation for that region is performed 332 (See also FIG. 15, 1513). The peak location of the dispersion data is recorded 336 and a threshold is calculated 338 (1508). The thresholded image 340 is inspected to find the left and right edge of the text 342 by symmetrically searching through the threshold dispersion data starting at the peak value. The text is located by the change in value of the binary result of 340. The location of the text horizontally is recorded 344 and a baseline length is determined 346.

IV. Measurement of Text Sharpness

Figure 5:
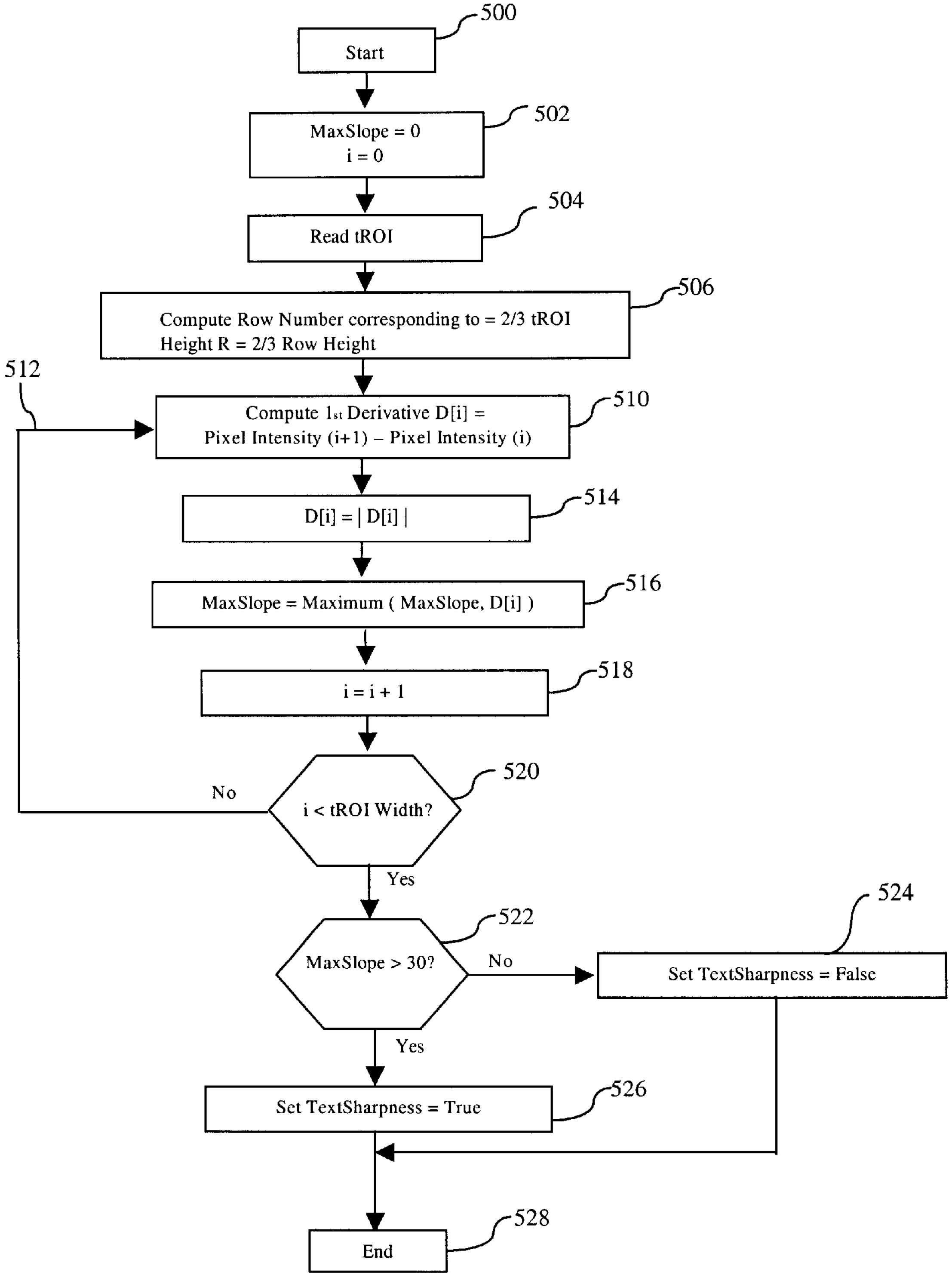
FIG. 5 shows the text sharpness computation process

Text sharpness measurement 116 occurs after a text string is located 104. FIG. 5 shows the flow diagram for text sharpness measurement 116. An input gray scale image of the regionalized text is received 500. Index variables are initialized 502 and the coarsely located text string image is read into memory 504. The text is roughly characterized for edge sharpness by selecting a single row through a location likely to contain text and computing the maximum numeric derivative found in that row using a numerical differential process 510, 514, 516, 518, and 520. If the maximum change exceeds a predetermined amount 522, a flag is set 526. The flag value is output 107 (see FIG. 1)

V. Signal Enhancement

Figure 4:
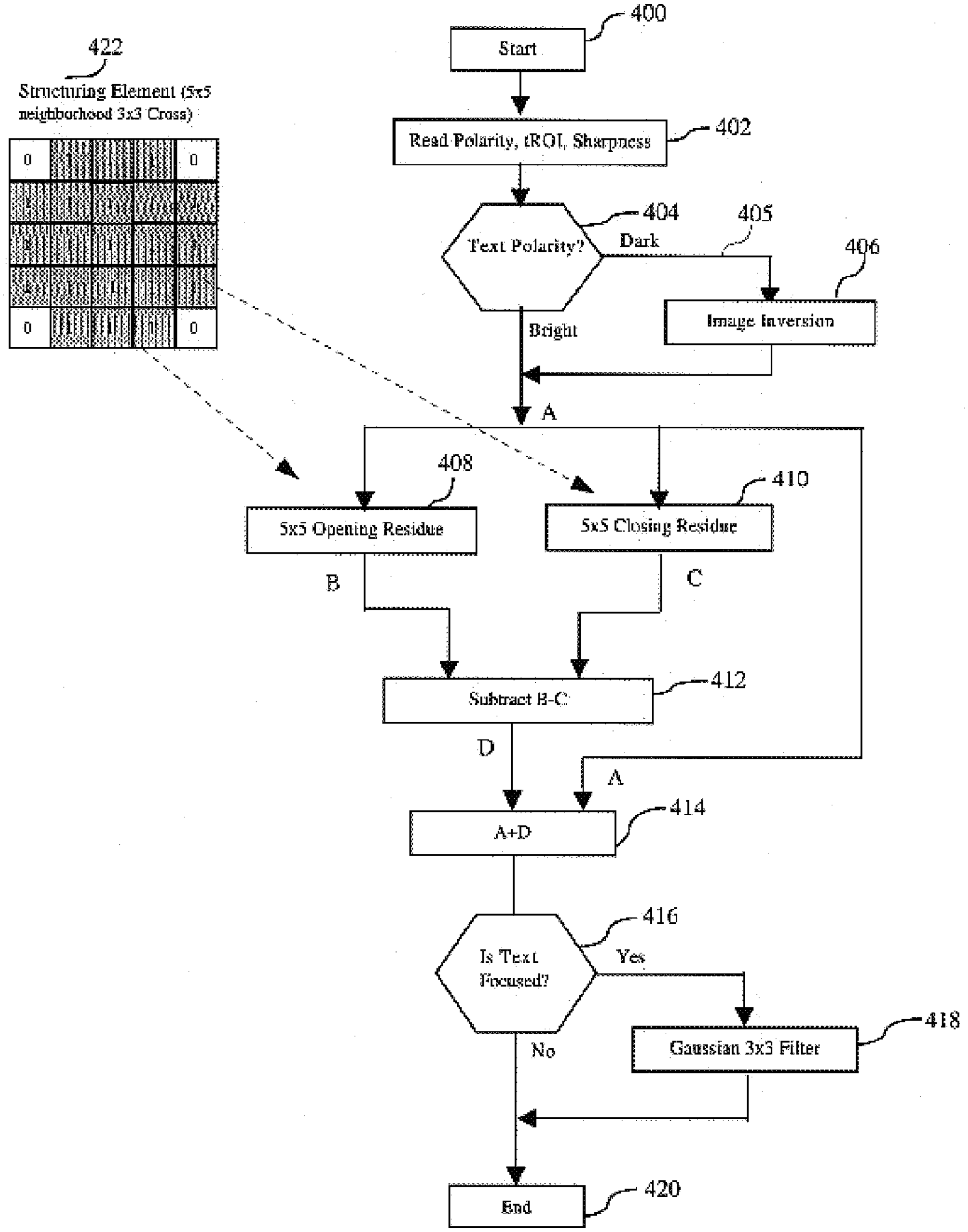
FIG. 4 shows the flow diagram for signal enhancement

FIG. 4 outlines the processing flow for the signal enhancement portion 106 (FIG. 1) of the invention. This module is responsible for increasing the contrast between the text and the background. Text location tROI 114, polarity 103 and text sharpness 107 are read in to memory 402. Text polarity is determined 404. If the input text polarity 103 is dark 405 (dark text with bright background) then the image is inverted 406 so that the resulting image contains bright text on a dark background regardless of its original input polarity. Both an opening residue 408 and a closing residue 410 operation are performed on the resulting image. These operations enhance the edges of the text. In this embodiment, the morphological kernel used to perform the residue operation is a cascade of 5×5 square with a 3×3 cross 422. The resulting residue operations are subtracted 412 and the result added to the original input image 414 to produce a signal enhanced result. If the sharpness flag 107 indicates that the input image contained high frequency edges above a certain amount 416, then the resulting image is low pass filtered 418 using a Gaussian 3×3 kernel. This reduces any aliasing effect when performing the regional correlation operation.

VI. Magnification Normalization

Figure 6:
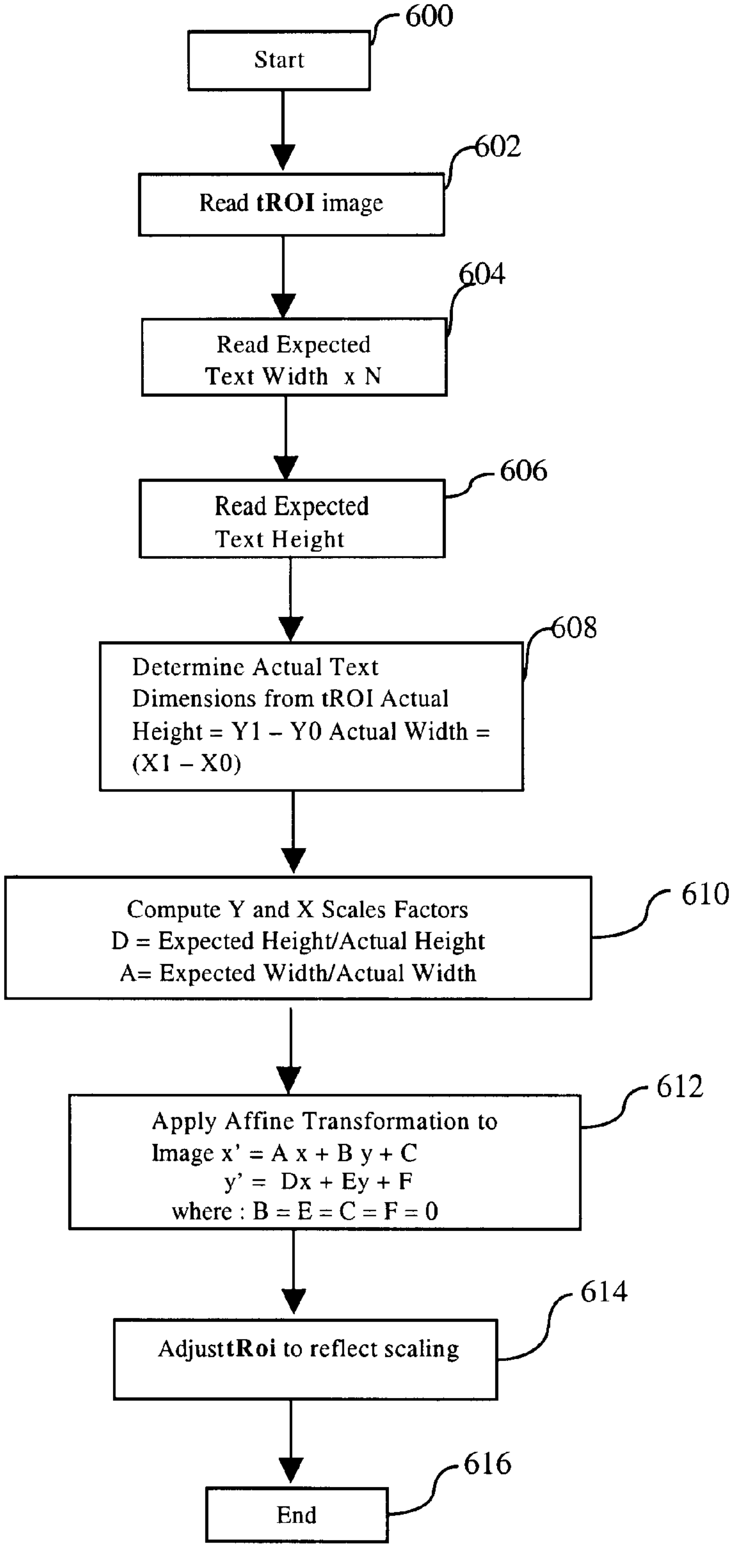
FIG. 6 shows the magnification adjustment process

FIG. 6 outlines the processing flow for the magnification normalization stage 108. The input text string image must be adjusted so that it is compatible with the size of the text described in the Character Feature Template (CFT). Any mismatch in scaling between the input characters and the CFT will result in degraded correlation results. The width and height of the CFT is known in advance and it is a simple matter to apply the Affine Transformation to the image region tROI containing the text string.

The gray scale region of the input image containing the text string is read into memory 602. The expected text height 606 and width 604 is read from the character feature template. The actual text dimensions are determined from the region tROI 114 (see also FIG. 12, 1216). The actual height corresponds to the difference of the y coordinates (a-b) in 1216. The actual width of the text is the difference of the x coordinates in 114(see also FIG. 15, 1515). The y magnification scale factor D 610 is computed as the ratio of the expected text height to the actual text height determined from tROI 1216. The x magnification scale factor A 610 is computed as the ratio of the expected text width to the actual text width determined from TROI 1515. Scale factors for magnification normalization are computed by forming the ratio of expected text height to actual text height. An Affine Transformation is performed 612 and the image is re-sampled 614 into the coordinate space defined by x' 612 and y' 612. Since the operation only involves scaling, the other coefficients in 612 B, E, C and F are 0. Once the transformation is performed on the image, the dimensions of tROI are also adjusted to reflect the difference in size.

VII. Character Y-Offset Position Determination

Figure 7:
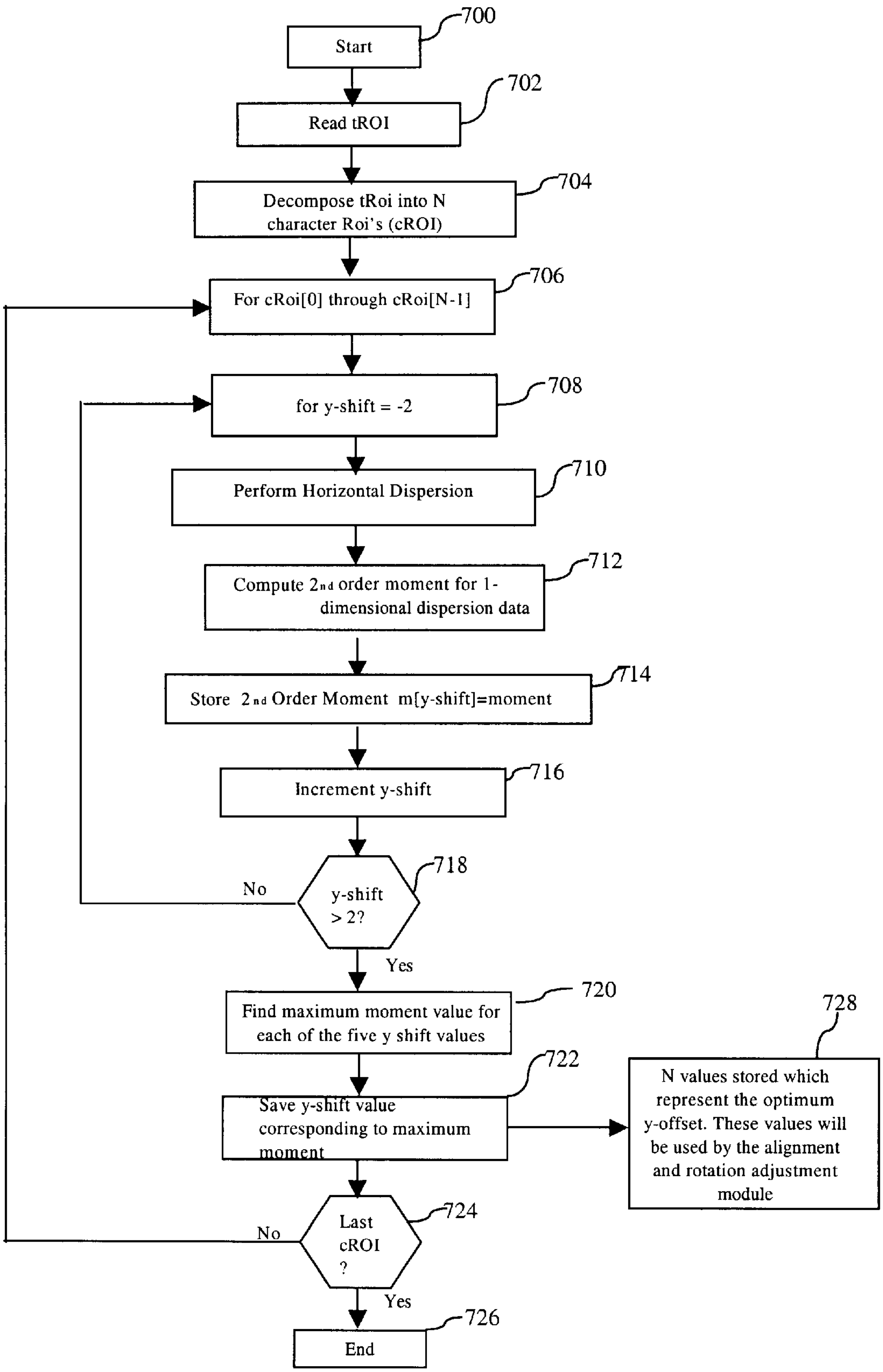
FIG. 7 shows the Y alignment score flow diagram

FIG. 7 outlines the processing flow for the y alignment score. This module 132 generates a y-alignment score that represents the best y position offset for each character. This score is used to correct for character offset and rotation (see section VIII Character Rotation Determination) that may be present in a misaligned or corrupted string.

The gray scale region of the input text image that contains the text string is read into memory 702. The text region is divided up into each character region 704, which is sequentially processed 706. The character is shifted through its entire allowed range 708, 716, 718 with each position tested by measuring the horizontal dispersion 710 second order moment 712 and saving the result 714. The moment scores for each position are analyzed to determine the maximum moment 720. The offset position of each character corresponding with the maximum moment value is saved 722 for each of the input characters 728.

VIII. Character Rotation Determination

Figure 8:
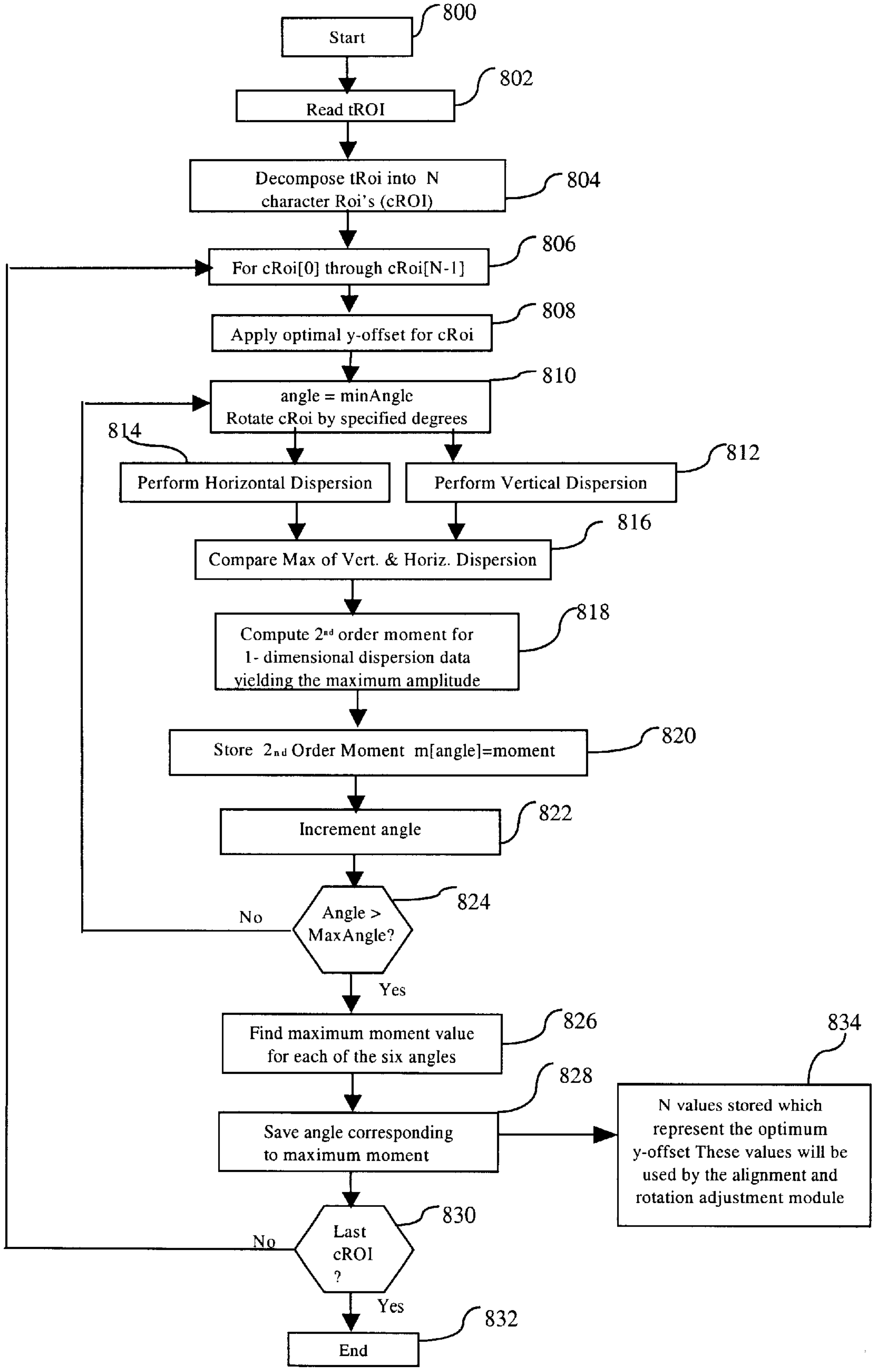
FIG. 8 shows the rotation score flow diagram

FIG. 8 outlines the processing flow for rotation scoring 134. This module generates a score that represents the angle that yields the best horizontal or vertical dispersion score for an individual character. Scores are generated for each of the 18 characters in the input string.

Figure 9:
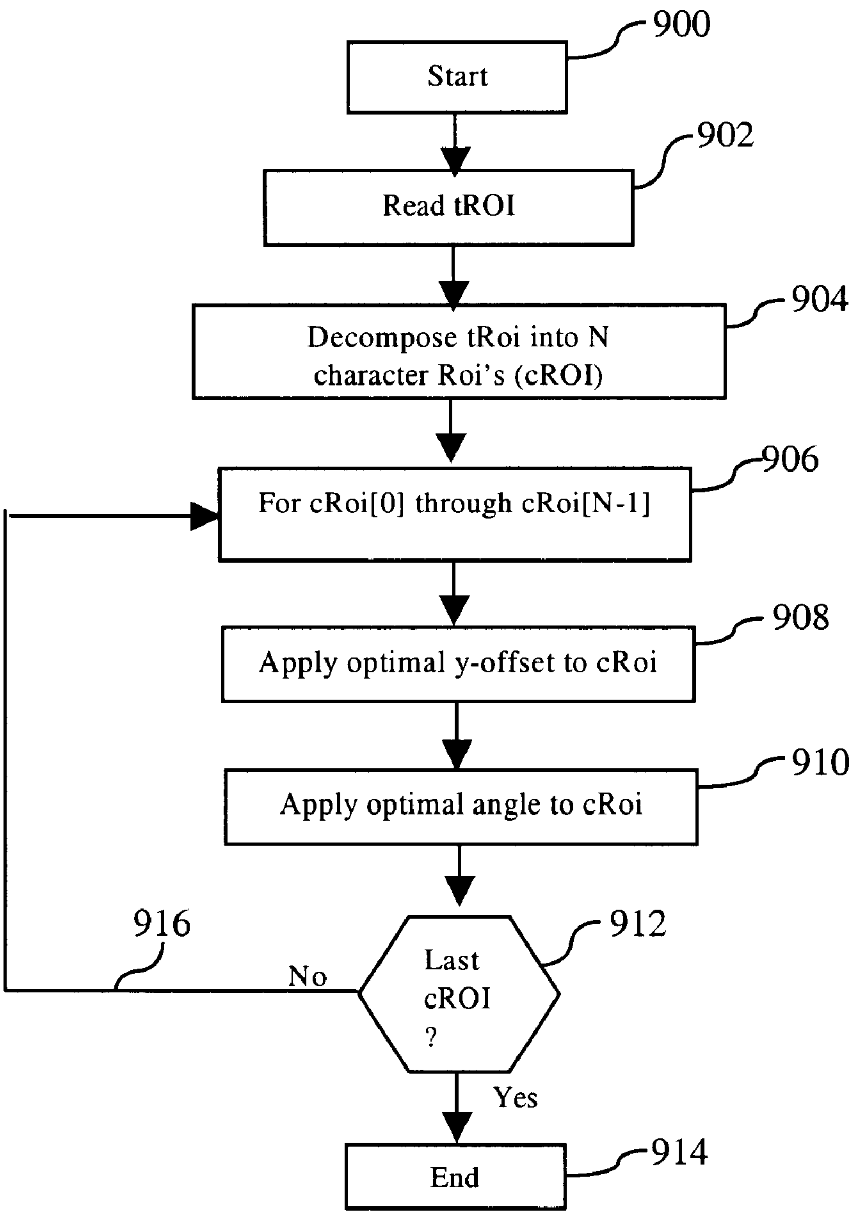
FIG. 9 shows a flow diagram for character alignment and rotation

The region of the gray scale input image containing the text is received 802 and decomposed into individual character regions 804. Each character is individually processed by offsetting the character to correct for its misalignment and then rotating the character about its center through the allowed rotation range 810, each time computing the horizontal dispersion 814 and vertical dispersion 812 that the rotation angle produces. Second order moments for the dispersion data are compared to find the maximum amplitude 818 and that maximum is stored 820. This is done for every allowable angle 822, 824. The rotation producing the highest second order moment is determined 826 and saved 828 for each character 834. This score is used by the alignment and rotation module to correct for character rotation prior to performing the hit/miss correlation IX. Character Alignment with Overall Text String FIG. 9 outlines the processing flow alignment and rotation adjustment 130. The operation simply applies the offset and rotation adjustment values that were determined previously to correct the input image. A gray scale text string for the text region of interest is read from memory 902 and broken up into individual character regions 904. In this embodiment there are 18 character positions in the text string. Each character position is individually offset 906, 908 and rotated 910 until the entire text string is completed 912. Importantly, the gray scale images must be reconstructed and re-sampled as part of the shifting and rotation adjustments in order to obtain sub-pixel alignments. The output from this stage provides the input to the Adaptive Threshold module 128 and ultimately the correlation engine 136.

X. Character Recognition

An understanding of the character recognition process can be achieved by studying FIG. 1. Referring to FIG. 1, the text region of interest tROI 144 is input to alignment scoring apparatus 132 and rotation-scoring apparatus 134 produces outputs to an aligner and rotator 130 to operate on the input image 110 and produce a gray scale image output 129. The image output 129 is thresholded 141 and input to a character recognition engine 136. The character recognition process utilizes a-priori knowledge of individual character field rules 142 and character feature templates 126 to produce a best guess character output 137. The characters selected for the text string are checked against a checksum logic to produce an invalid output 145 or a valid output 124. Special exceptions for the entire text string are tested on the final result 122 to produce a valid output 126 or a failure to recognize flag 118.

Figure 11:
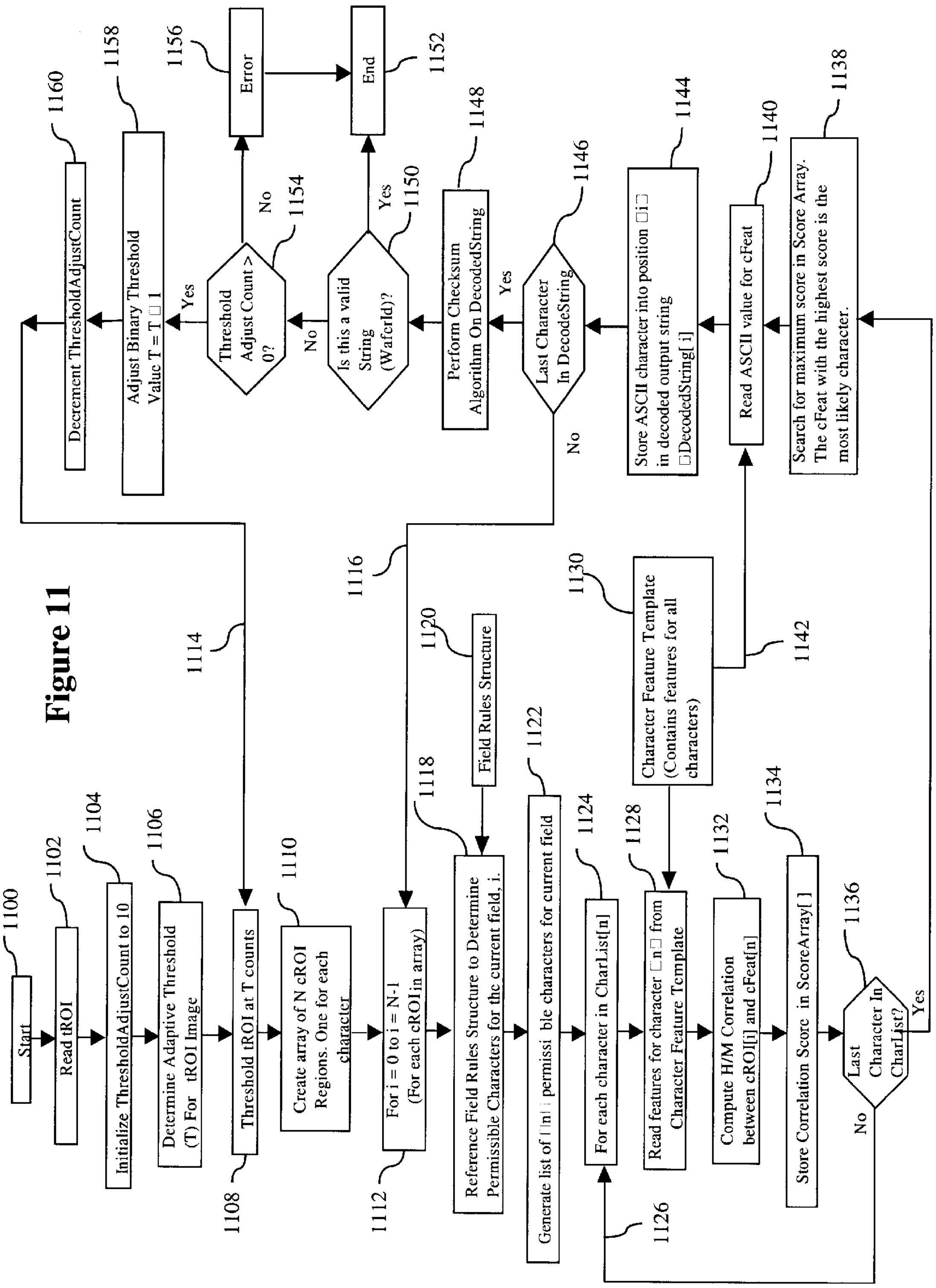
FIG. 11 is a flow diagram of the character recognition process

The detailed functions of each of the blocks within the character recognition section described above are further explained in FIG. 11. In the character recognition process the normalized magnification and signal enhanced gray scale region of the image input is read 110, 1102 from the magnification normalizer 108 and aligned and rotated to produce an output gray level image of a text string 129. The gray scale image is thresholded through a process described in Section X (Adaptive Thresholding of GrayScale Image) utilizing a sequence of programming steps 1104, 1106, 1108 having an adjust threshold input 1114 which is important if the checksum logic upon conclusion produces a failure result. An array of individual image regions cROI 1110 is created for the individual character recognition process. Each character has rules designated a-priori for its particular significance within the overall text string, that restrict the degrees of freedom for character assignment 1118, 1120. For each permissible character 1122 a template described in Section IX is used in a correlation process described in section X in steps 1124, 1128, 1130, 1132, 1134, 1136, 1138 to produce a best correlation result which is assigned its ASCII value 1140. This process is repeated for each character in the character string (in the preferred embodiment there are 18 characters allowed by SEMI specification M13-0998 (specification M13-0998, "Specification For Alphanumeric Marking Of Silicon Wafers"), with some fields within the text string being further restricted). The initial result is tested for validity 1150 using a check sum process. If it passes, the entire text string is passed on for exception processing 1152, 122. If the checksum is not valid, the threshold is adjusted 1154, 1158, 1160 and the recognition process is repeated starting at step 1108. If recognition cannot be achieved after a selected number attempts, an error condition 1156 is output.

XI. Adaptive Thresholding of Gray Scale Image

Figure 10:
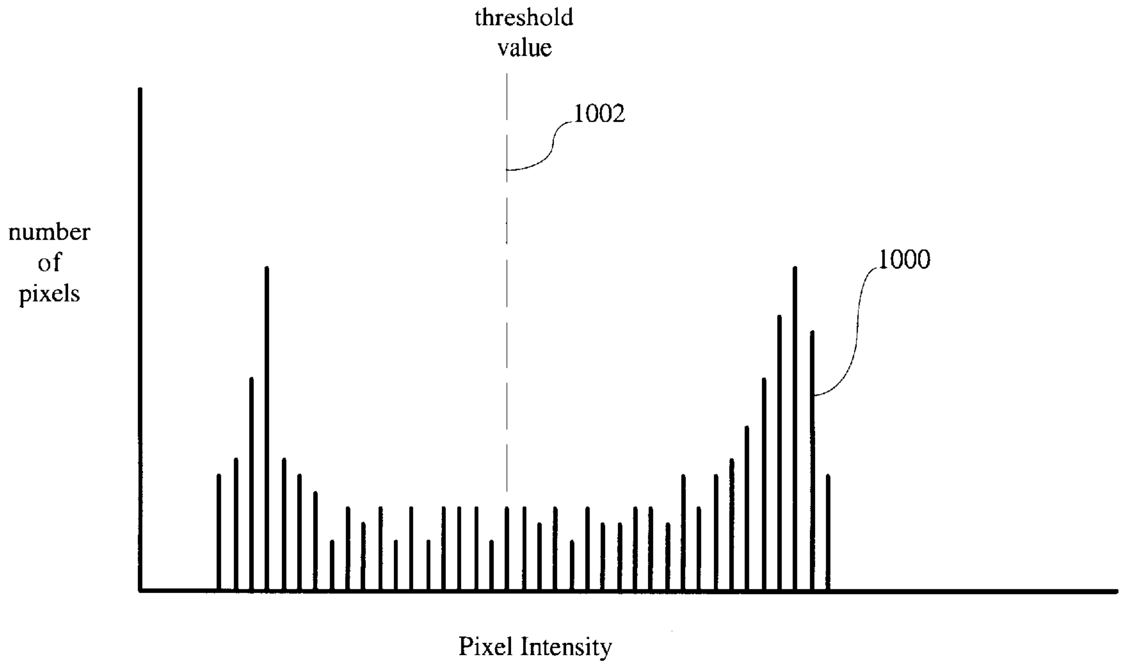
FIG. 10 shows an example bi-modal distribution of gray scale pixel intensities and a selected threshold.

Once the gray scale characters are normalized and localized into a regional text string, the whole character string can be thresholded to ease calculation of sub-regional correlation. For applications with significant image variations, or low contrast between characters and the background, an adaptive histogram thresholding method can be used to account for the variation. FIG. 10 illustrates an example histogram distribution for one embodiment wherein the regional distribution of pixel intensities is generally bi-modal, but with some indistinctness attributable to image to image variability. In the embodiment the adaptive histogram thresholding method assumes that an image histogram 1000 contains a mixture of two Gaussian populations and determines the threshold value 1002 from the histogram that yields the best separation between two populations separated by the threshold value (ref.: Otsu N, "A Threshold Selection Method for Gray-level Histograms," IEEE Trans. System Man and Cybernetics, vol. SMC-9, No. 1, January 1979, pp 62–66).

FIG. 16 shows an actual example resulting from the adaptive threshold process. The input to the Adaptive Threshold Algorithm 129, 1629 is a region of the image that contains the entire grayscale text string. In the present embodiment this region has already been adjusted for rotation and y-offset so that all characters are well aligned. This region is 20 pixels high by 324 pixels (18 pixels/char×18 characters/string) wide. The adaptive histogram 1628, analyzes this grayscale region 1629 and determines the threshold value using the threshold selection method for gray level histograms to separate the foreground pixels (text) from the background pixels. The resulting threshold value 1647 is applied to the input image 1629 and the binary result 1646 is decomposed into individual characters 1640 and sent for regional correlation 1642.

XII. Organization of Character Feature Template

Figure 14:
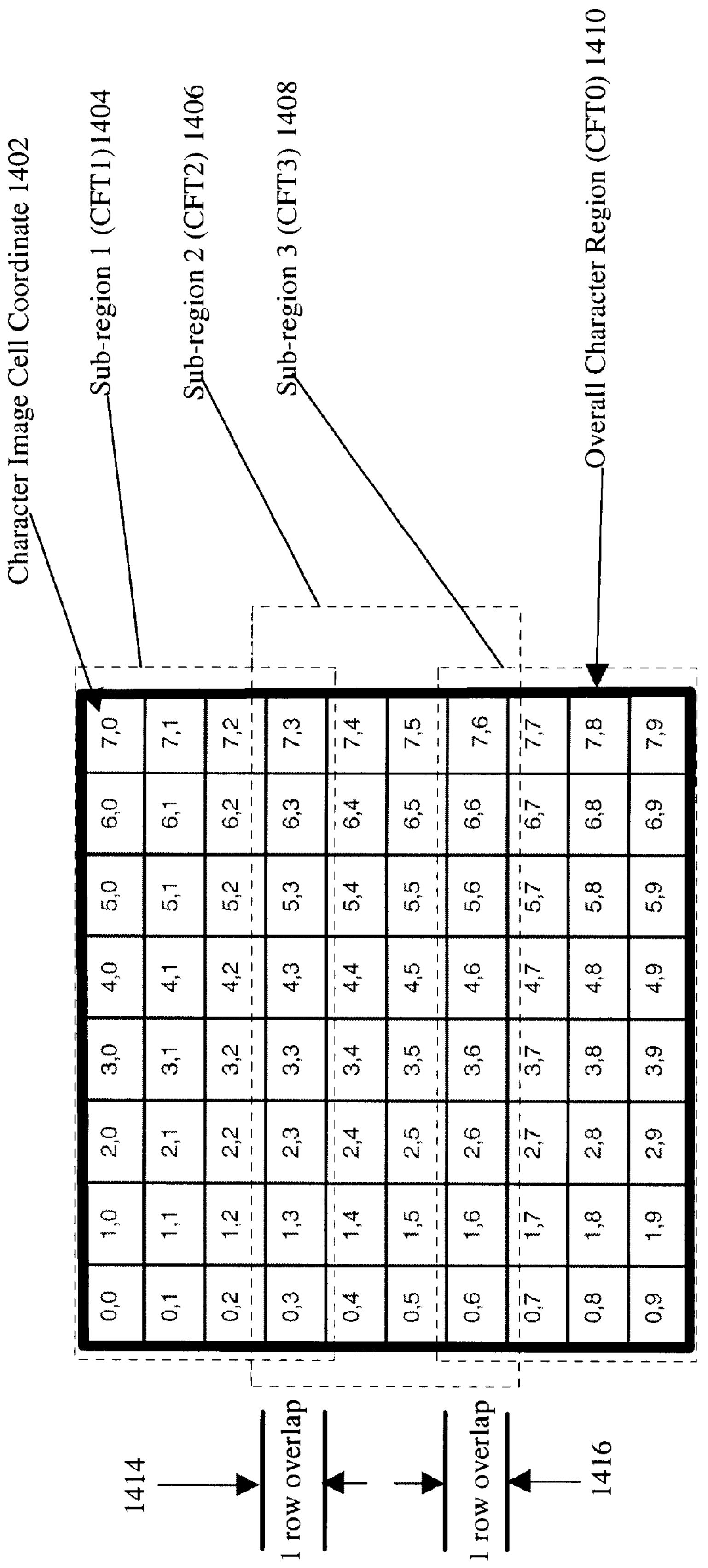
FIG. 14 shows a character image cell with pixel address structure

FIG. 13 shows the Character Feature Template (CFT) 1312 for a character 'P' with hit and miss designations. FIG. 14 shows the corresponding character image cell 1410 with corresponding sub-regions 1404, 1406, 1408 having cell image coordinates 1402. In this invention, the character template is divided into regions 1302, 1304, and 1306 to compute regional values for correlation. Regions are shown divided horizontally and overlapping by one pixel 1414, 1416 (see FIG. 14). For different applications, it may be desirable to divide the character differently, for example vertically, diagonally, or spiral. Where motion is involved, regions may be temporally constructed. For 3D applications, regions can be designated for depth planes. More or less than three regions can be used and overlaps may be more or fewer than one pixel. For purposes of this embodiment, the overlaps that were used are shown in FIG. 14. The hit template weights are h=1 and m=0 as shown in FIG. 13. The miss template weights are h=0 1310 and m=1 1308. The organization and structure described is selected based upon a-priori knowledge of the application.

XIII. Hit and Miss Correlation Algorithm

Once the text has been located, aligned, pre-rotated, and enhanced, the input image is thresholded and the correlation process is performed to determine the most likely characters within the string. Generally the hit and miss correlation algorithm follows a normalized correlation process described in Ballard and Brown, "Computer Vision", ISBN 0-13-165316-4, Prentice hall 1982,Chapter 3, pp67–69 except that the correlation process is performed on a partial character basis to allow for best fit where characters are partially occluded or overwritten or corrupted by any spatially variable noise source.

Sub-Region Hit Correlation Computation:

Let $f_1(x)$ and $f_2(x)$ be the two images to be matched. Where $q_2$ is the patch of $f_2$ (in the present embodiment it is all of it) that is to be matched with a similar-sized patch off $f_1$. $q_1$ is the patch of $f_1$ that is covered by $q_2$ when $q_2$ is offset by y.

Let E() be the expectation operator. Then $$\sigma(q_1)=[E(q_1^2)-(E(q_1))^2]^{1/2}$$

$$\sigma(q^2)=[E(q_2^2)-(E(q_2))^2]^{1/2}$$

define the standard deviations of points in patches $q_1$ and $q_2$. (For notational convenience, we have dropped the spatial arguments of $q_1$ and $q_2$.)

For the preferred embodiment:

$q_1$ is the distribution of weights in the Correlation Feature Template designated "h" 1310 see FIG. 13

$q_2$ is the distribution of bit-mapped pixels (binary) in the input image that correspond to the same locations defined in the feature template (see FIG. 14).

Then the $n^{th}$ region's hit correlation, $H_n$, for given character P is determined by:

$$H_n(P)=\frac{\Sigma[E(q_1q_2)-E(q_1)E(q_2)]}{\sigma(q_1)*\sigma(q_2)}$$

n=feature CFT region 1, 2 or 3 1404, 1406, 1408

Where:

$E(q_1q_2)$: expected value of the product of each of the "hit" feature values and the corresponding input pixel $E(q_1)E(q_2)$ expected value of the product of the means of the hit population and the corresponding input pixels Sub-Region Miss Correlation Computation:

Let $f_1(x)$ and $f_2(x)$ be the two images to be matched. Where $q_2$ is the patch of $f_2$ (in the present embodiment it is all of it) that is to be matched with a similar-sized patch off $f_1$. $q_1$ is the patch of $f_1$ that is covered by $q_2$ when $q_2$ is offset by y. Note, however, that in the miss correlation $q_2$ is the binary complement of the original binary input.

Let E( ) be the expectation operator. Then $$\sigma(q_1)=[E(q_1^2)-(E(q_1))^2]^{1/2}$$

$$\sigma(q_2)=[E(q_2^2)-(E(q_2))^2]^{1/2}$$

define the standard deviations of points in patches $q_1$ and $q_2$. (For notational convenience, we have dropped the spatial arguments of $q_1$ and $q_2$.)

Define:

$q_1$ is the distribution of feature weights in the Correlation Feature Template designated "m" 1308 see FIG. 13

$q_2$ is the two's complement distribution of bit-mapped pixels (binary) in the input image that correspond to the same locations defined in the feature template see FIG. 14

Then the nth regions miss correlation, $M_n$, for given character P is determined by:

$$M_n(P) = \frac{\Sigma[E(q_1 q_2) - E(q_1)E(q_2)]}{\sigma(q_1) * \sigma(q_2)}$$

n=feature CFT region 1, 2 or 3 1404, 1406, 1408

Where:

$E(q_1q_2)$: expected value of the product of each of the miss feature values and the corresponding input pixel $E(q_1)E(q_2)$: expected value of the product of the means of the miss population and the corresponding mean of the input pixels And $$\sigma(q_1)=[E(q_1^2)-(E(q_1))^2]^{1/2}$$

$$\sigma(q_2)=[E(q_2^2)-(E(q_2))^2]^{1/2}$$

The preferred embodiment provides a correlation output value for each of three regions of each character CFT1, CFT2, or CFT3 (noted as $C_n(P)$ where P represents a particular character within the string and n indicates a sub-region of that character).

$$C_n(P)=H_n(P)*(1-M_n(P))$$

$C_n(P)$ is the sub-region "n" overall correlation $H_n(p)$ uses the sub-region "n" hit correlation template (FIG. 13 with h=1, m=0)

$M_n(p)$ uses the sub-region "n" miss correlation template (FIG. 13 with h=0, m=1)

For a particular character P, if all the scores are within 80% of the highest regional correlation score (highest of the three), then a character is assigned according to a weighted average.

$$C_{tot}(P)=[\alpha C_1(P)+\beta C_2(P)+\delta C_3(P)]/3$$

In one preferred embodiment, the weights are assigned $\alpha=\beta=\delta=1$, so the correlation score becomes a simple average. Based upon a-priori knowledge, different weights may be assigned to advantage.

If the three regions are not within 80% of the highest value (as for example when one of the regions, $C_3(P)$ in this example, is occluded or overwritten or excessively noisy and therefore has a low $C_{tot}(P)$) the weighting factors are adjusted according to the following values: $\alpha=\beta=1.2$, $\delta=0.6$.

Character assignment is made according to the highest $C_{tot}(P)$ value.

XIV. Optimization of Region and Weights

Figure 17:
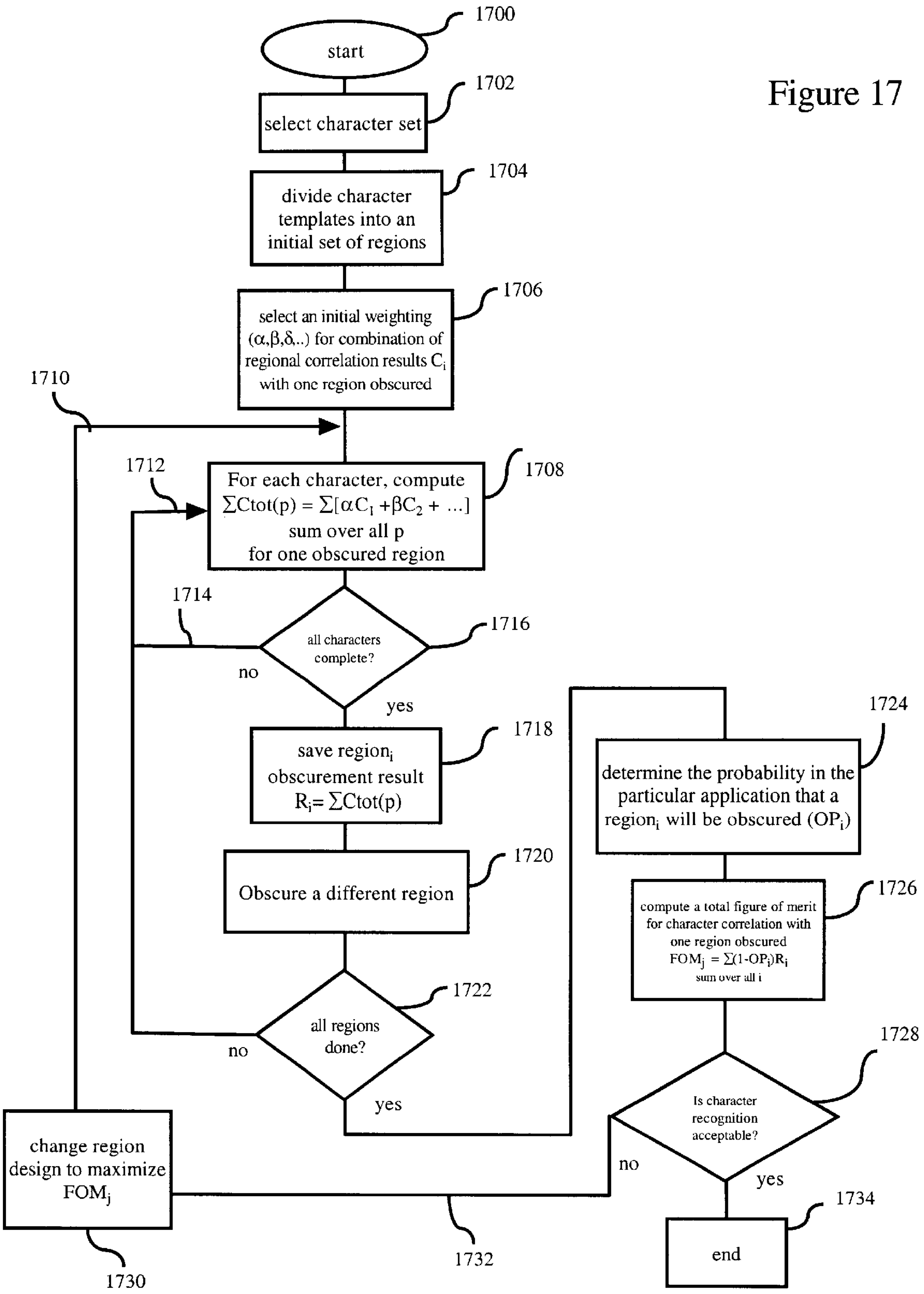
FIG. 17 shows a flow diagram for a process to optimize region design for a particular application and character set

The question naturally arises: Given that a particular character set is to be used, are the sub-regions and weights optimum for recognizing obscured characters? From the foregoing discussion, it is apparent that a test can be conducted to optimize the regions design and the weights that are selected. FIG. 17 shows how region design could be optimized. In the optimization process, the regions are adjusted and a test is run to determine $C_{tot}(P)$ for all P given that any portion of a character is obscured or excessively noisy. If knowledge of the process gives a-priori knowledge of the most likely to encounter type of interference, frequency of interference, nature of interference or region of obscuration, then this knowledge can be incorporated into the optimization process. If the application process statistical properties are known, then probabilities of particular types of interference can also be used to produce a measure for region design.

In an embodiment to optimize region design, a character set is selected 1702 and an initial region design is created 1704. Weights are specified 1706 for combining regional results both for no obscuration or with an obscured region. For each character in the character set the character correlation is computed with one region obscured 1708, 1716. A total regional obscurement result, $R_i$ 1718, is computed by summing the results for each individual character. This result is obtained for each region 1722 so for three regions there would be three results $R_1$, $R_2$, $R_3$. For the intended application the probability for obscurement of a particular region is estimated 1724. For a given region design, a figure of merit for overall expected performance FOMJ 1726 is computed. Region design is then adjusted 1728, 1730 until a satisfactory result is obtained. There can be any numer of Regions. Regions can be any shape, orientation, overlap, or characteristic according to the need of the application or the intuition of the designer. Regions may not be uniform in size or shape or may be distinguished by multiple images or motion of the character. Different characters may have their own specialized region design. In the current embodiment, the highest FOMJ represents the best region design for regional obscuration in the intended application.

XV. Optimization of Character Set

In the same way that regions and weights can be optimized, the character set design can be optimized if the regions and weights are known. In the optimization process, the character designs are adjusted and a test is run to determine $C_{tot}(P)$ for all P given the obscuration and interference conditions that are to be encountered. Sort the results for maximum discrimination of the character set and if the discrimination is not sufficient, change the character set further and run the test again until a satisfactory result is obtained.

XVI. Character Feature Weighting by Reference Image Learning

Figure 18:
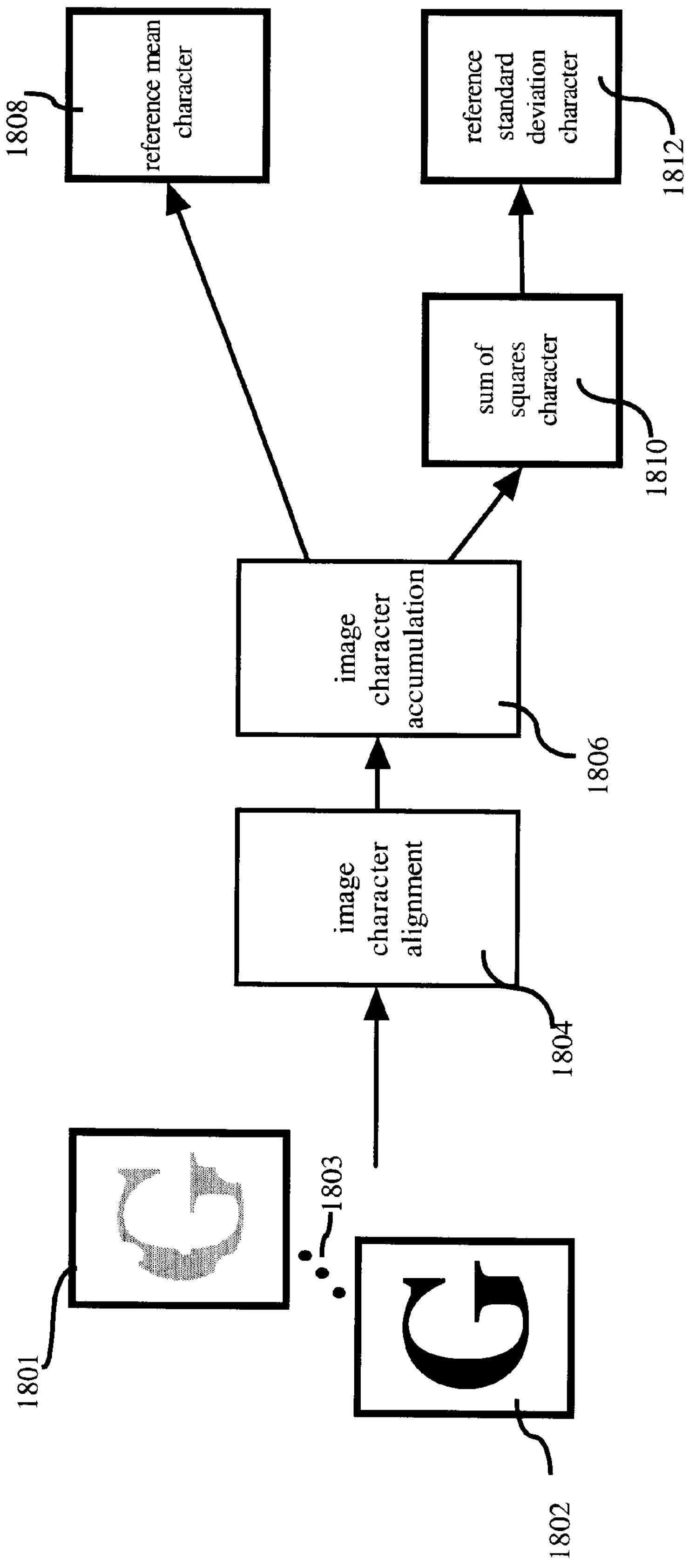
FIG. 18 shows a flow diagram for the process that computes the reference mean character and reference standard deviation character images from representative images containing single character samples

In another embodiment, non-uniform weights are assigned to each pixel within a region. In effect the hit weighting factors h 1310 (FIG. 13) could be replaced by such a weighting scheme. Weights are created for each pixel or small group of pixels using learning techniques that characterize signal variation of a particular application scenario to determine pixels within the template that yield results most consistent with the appropriate classification. Edge pixels in a character, for example, are more subject to variations in illumination or systematic noise than pixels located toward the center of a character. Hence, weights are constructed such that edge pixels are assigned a lower weight than those located further from the edge. This embodiment, shown in FIG. 18, would capture and characterize normal variation by accumulating a plurality of input images 1802 for each character in the character set. After precise alignment between characters 1804, individual pixel values would be accumulated 1806. This accumulated representation of the character 1806 contains the inherent variation experienced within the input character set and is analyzed statistically to determine a reference mean character 1808 and reference standard deviation character 1812. Such learning techniques are disclosed in U.S. patent application Ser. No. 09/703,018 entitled, "Automatic Referencing for Computer Vision Applications" by Shih-Jong J. Lee et. al., filed Oct. 31, 2000 which is incorporated in its entirety herein.

Reference Mean Character Image Generation

A reference mean character 1808 is computed as outlined in the formula below. Representative input images containing characters, $C(input_i)[r][c]$ (1801, 1802, 1803), of r rows by c columns of pixels, are aligned by an image character alignment mechanism 1804. This alignment can be performed in the same manner outlined in 130, 132 and 134. The accumulated character image after image i, $C_{accum}$(i)[r][c] (1806), represents the two dimensional character image array of arbitrary size r×c pixels. The accumulation occurs for each of these rows and columns for all samples (1801, 1802, 1803) of the aligned input image C(aligned input)[r][c]. A weighting factor $W_i$, is applied to incoming character $image_i$. Usually a weighting factor of 1 is applied, however, this value can be dynamically adjusted depending on the relative quality of the input character or another measurable character attribute. Adjusting the input weight $W_i$ dynamically and using representative images to characterize character pixel weights for each pixel location r, c constitutes the learning reference process.

$$C_{accum}(i)[r][c]=C_{accum}(i-1)[r][c]+W_i{*}\ C(\text{aligned input}_i)[r][c]$$

The mean reference character 1808 is simply the accumulated character image $C_{accum}$ divided by the total weight used during the learning process. Thus, n $$C_{mean}[r][c] = C_{accum}(new)[r][c] \Big/ \sum_{i=1}^{n} W_i$$

Mean Sum of Squares Character Image Generation

The sum of square character image $C_{sos}$ 1810 is set equal to the squared image of the first aligned character learning image and is subsequently updated for additional learning images by the following formula:

$$C_{sos}(i)[r][c]=C_{sos}(i-1)[r][c]+W_i{*}C(\text{input aligned})[r][c]{*}C(\text{input aligned})[r][c]$$

Where "$C_{sos}$(i)[r][c]" represents the pixel of the new (updated) value of the sum of square image $C_{sos}$ located at row r and column c after i samples are accumulated; "$C_{sos}$(i)[r][c]" represents the pixel value of the old sum of square image value location at row r and column c. In an embodiment the original character image has 8-bits of dynamic range. The accumulation and sum of squares images, however, must have increased dynamic range to ensure the precision of the resulting image. The increase in dynamic range required is a function of the number of character images, n, (1801, 1802, 1803) accumulated during the learning process.

Reference Deviation Character Image Generation

A reference deviation character image, $C_{dev}$ 1812, is constructed from the sum of squares character images $C_{sos}$ and the mean character image $C_{mean}$ as shown in the formula:

$$C_{dev}[r][c] = SQRT\left(C_{sos}(new)[r][c] \Big/ \sum_{i=1}^{n} W_i - C_{mean}[r][c] * C_{mean}[r][c]\right)$$

Where SQRT is the square root function. In one embodiment of the invention, the division and the SQRT function are done using look up table operations to save time (see U.S. patent application Ser. No. 09/693,723, "Image Processing System with Enhanced Processing and Memory Management", by Shih-Jong J. Lee et. al, filed Oct. 20, 2000 which is incorporated in its entirety herein).

Computing CFT Weights Based on Reference Images

As mentioned earlier, the reference images generated during the learning process can be used to determine the weights h 1310 (FIG. 13) contained in the Character Feature Template (CFT) 126 (FIG. 1). Thus, portions of the character that exhibit high variation and ultimately contribute to a less reliable classification are weighted such that they contribute less to the overall hit correlation score $H_n$(P) (section VII: Hit and Miss Correlation Algorithm). Portions of the character that exhibit less variation during the learning process are consequently weighted higher, making their contribution to the hit correlation score more significant. In the present embodiment the formula for computing the hit weight is:

$$h[r][c]=C_{mean}[r][c]/(\alpha+C_{dev[r][c]})$$

where α is a fuzzy constant to control the amount of normalization; $C_{mean}$[r][c] is the value of the character mean image at location row r, column c; and Cdev[r][c] is the value of the character deviation image located at row r and column c.

Another embodiment for determining the weights h[r][c], would be:

$$h[r][c]=1-[(C_{dev}[r][c]-C(\min)_{dev}[r][c])/(C(\max)_{dev}[r][c]-C(\min)_{dev}[r][c])]$$

Where h[r][c] represents the hit weight at location row r and column c for a particular character in the Character Feature Template 126; $C_{dev}$[r][c] represents the deviation value for the same location in the character; $C(\min)_{dev}$[r][c] represents the minimum value contained in the character deviation image $C_{dev}$; and $C(\max)_{dev}$[r][c] represents the maximum value in the character deviation image $C_{dev}$. With this approach, all weights are normalized to the maximum deviation exhibited by the character in the learning image set. This approach results in weight values between 0 and 1.

In yet another embodiment, the approach above is applied to both the hit and miss correlation computations simultaneously. Thus, the m feature weights 1308 (FIG. 13) would also be adjusted according to the degree of variation exhibited at each location external to the character as determined from the learning images.

A learning process can be performed online during the actual character recognition process or it can be performed off-line, in advance of utilization and with a selected learning set of images.

XVII. Checksum Logic and Character Replacement Strategy for Invalid Strings

In one embodiment the Checksum Logic Module 138 (FIG. 1), is responsible for determining the efficacy of a decoded WaferID by applying the checksum or error detection method outlined in SEMI specification M13-0998 (specification M13-0998, pp 6–8, "Specification For Alphanumeric Marking Of Silicon Wafers"). This algorithm uses the last two characters as a checksum whose value is unique for a given set of input characters. Thus, the checksum is generated based on the preceding 16 characters in the WaferId string.

If the checksum indicates an invalid ID, the string is re-constructed and re-evaluated before the threshold 145 is adjusted and control is passed back to the Binary Threshold Module 141. The string re-construction process reviews the correlation values generated by the Character Recognition Module 136 to determine which characters had minimal correlation margin between the highest correlation and next to highest correlation scores for each character. In one embodiment, characters with less than a 5% differential between these scores are replaced with the next most likely ASCII character (one at a time). The string is then re-evaluated by the error detection module to determine the efficacy of the string. The process continues until all characters with less then 5% margin have been replaced with the second most likely substitute character. If a valid ID has not been determined after all these characters have been replaced then the Checksum Logic Module 138 issues an adjust threshold signal 145 and control returns to Module 141.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A method for determining the characters most likely to be contained in a text string comprising the steps of:

a. receiving at least one input image;

b. localizing the region of the image that contains a text string;

c. performing a plurality of correlations between each character region in the text string and multiple region character templates to output multiple regional correlation results for each character;

d. combining the multiple regional correlation results outputs to output a single correlation output for the character region of the input image;

e. selecting the most likely character based upon the character correlation output.

2. The method of claim 1 wherein the correlations are normalized correlations.

3. The method of claim 2 wherein the normalized correlations have weights.

4. The method of claim 3 wherein the weights are determined from reference images.

5. The method of claim 1 wherein the regional correlation results outputs are combined with weights selected based upon regional correlation values to create a single correlation output for the character region of the input image.

6. The method of claim 5 wherein the skew is determined by maximizing the second order moment of the character's dispersion result.

7. The method of claim 1 wherein the combining weights are determined based upon regional correlation results for each character.

8. The method of claim 1 wherein the image of each character is adjusted for skew from its position in the overall text string position.

9. The method of claim 1 wherein the image of the character is adjusted for rotation from its intended alignment with respect to the overall text string.

10. The method of claim 9 wherein the rotation is determined by maximizing the second order moments of horizontal and vertical dispersion results.

11. The method of claim 1 wherein the correlations are hit or miss correlations.

12. The method of claim 1 wherein text polarity is determined and compensated.

13. The method of claim 1 wherein correlations are only performed using character templates that are permissible for the particular field of the text string.

14. The method of claim 1 wherein:

a. more than one image input is received, and b. for each image input, correlations are performed between each character region in the text siring and at least one region character template to produce at least one regional correlation result for each character region.

15. The method of claim 1 wherein character regions are defined based on time.

16. The method of claim 1 wherein regions are overlapped.

17. The method of claim 16 wherein the text string is initially thresholded based upon an adaptive histogram thresholding method.

18. The method of claim 16 wherein a validity result is determined by a checksum computed using previous characters in the string.

19. The method of claim 1 wherein regions have non-uniform sizes.

20. The method of claim 1 wherein regions have non-uniform shape.

21. The method of claim 20 wherein an invalid result is rectified by character replacement to produce a valid result.

22. The method of claim 21 wherein a-priori estimates of application regional obscuration probability characteristics are used in evaluating maximum overall character detection.

23. The method of claim 22 wherein the character feature template weights are determined from reference images.

24. The method of claim 1 wherein a. the input image contains multiple characters that can be subdivided into regions;

b. a processed representation of the text string is two level based upon a threshold applied to the entire text string.

c. the text string output is tested for validity to produce a validity result;

d. the threshold is adjusted based upon the validity result.

* * * * *